United States Patent [19]

Elgersma et al.

[11] Patent Number: 5,561,993
[45] Date of Patent: Oct. 8, 1996

[54] SELF BALANCING ROTATABLE APPARATUS

[75] Inventors: Michael R. Elgersma, Plymouth; Theresa C. Jenne, Monticello; Kevin J. Stalsberg, White Bear Lake, all of Minn.

[73] Assignee: Honeywell Inc., Minneapolis, Minn.

[21] Appl. No.: 490,504

[22] Filed: Jun. 14, 1995

[51] Int. Cl.$^6$ .............................. D06F 37/22; F16F 15/167
[52] U.S. Cl. ............................ 68/23.2; 74/573 R; 74/574; 210/144; 494/82
[58] Field of Search .................................. 68/23.2, 12.06; 494/82; 210/144; 301/5.22; 74/573 R, 573 F, 574

[56] References Cited

U.S. PATENT DOCUMENTS

| | | | |
|---|---|---|---|
| 3,149,502 | 9/1964 | Caruso et al. | 74/573 |
| 3,275,146 | 9/1966 | Severance et al. | 210/144 |
| 3,304,032 | 2/1967 | Yapes . | |
| 3,330,168 | 7/1967 | Kahn | 68/23.2 X |
| 3,433,534 | 3/1969 | Mercer | 301/5.22 |
| 4,096,988 | 6/1978 | Scuricini | 494/82 X |
| 4,919,646 | 4/1990 | Perdriat | 494/82 X |
| 4,991,247 | 2/1991 | Castwall et al. | 68/23.2 X |
| 5,171,067 | 12/1992 | Kawabe et al. | 301/5.22 |
| 5,207,634 | 5/1993 | Greenstein | 494/82 X |
| 5,240,358 | 8/1993 | Hackett et al. | 74/573 R X |
| 5,490,436 | 2/1996 | Coyne et al. | 74/574 X |

Primary Examiner—Philip R. Coe
Attorney, Agent, or Firm—William D. Lanyi

[57] ABSTRACT

A system for balancing a rotatable member is provided by measuring forces and motion via accelerations at various locations of the system. The forces and moments are balanced through the use of matrix manipulation to determine appropriate counterbalance forces located at two axial positions of the rotatable member. As such, the system accounts for possible accelerations of a machine, such as a washing machine, which could not otherwise be accomplished if the motion of the machine was not measured. The system is therefore operable in conjunction with machines that are not rigidly attached to immovable objects, such as concrete floors. The algorithm permits the counterbalance forces to be calculated even though a washing machine is located on a moveable floor structure combined with carpet padding and carpets between the washing machine and a rigid support structure.

20 Claims, 11 Drawing Sheets

Note: A and F are really individual vectors

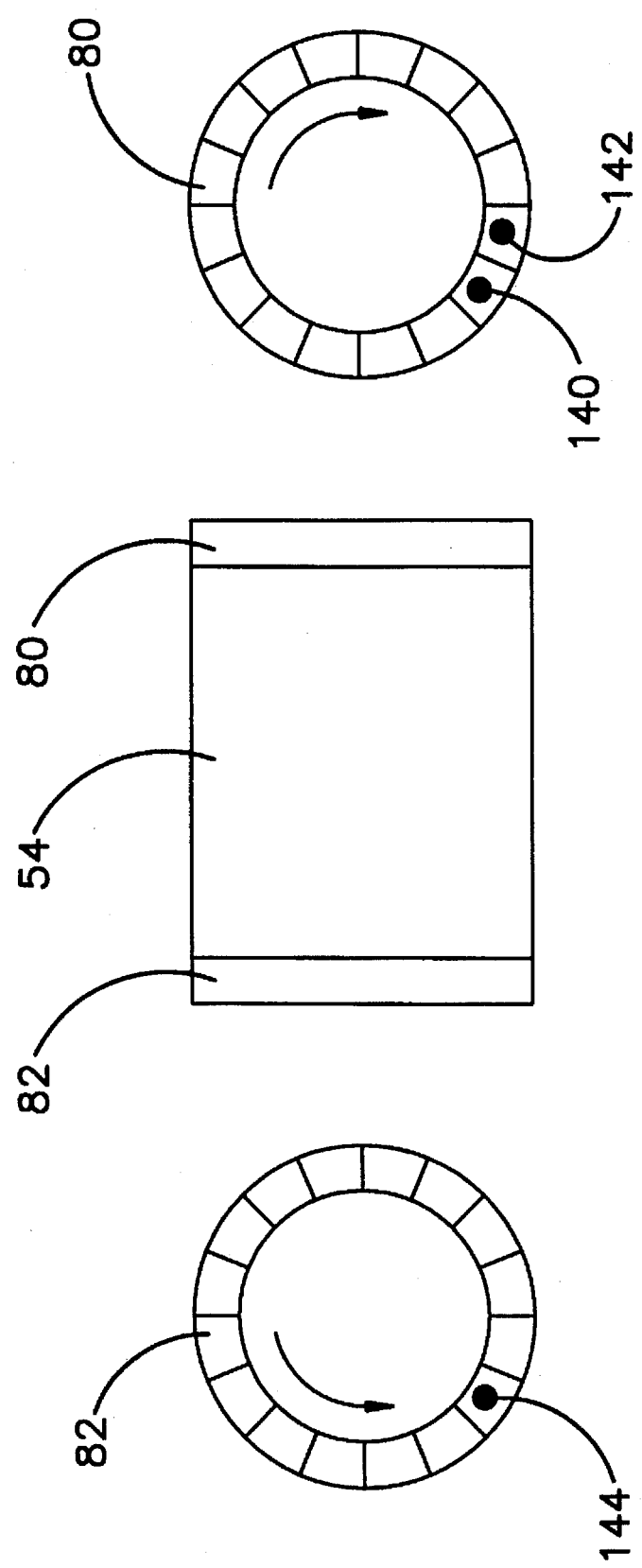

SELF BALANCING ROTATABLE APPARATUS

BACKGROUND OF THE INVENTION

1. Field of the Invention

The present invention relates generally to a rotatable member that is able to achieve a balanced condition throughout a range of rotational speed and, more specifically, a system that dynamically balances a rotatable member through continual determination of out of balance forces and motion and takes corresponding counter balancing action.

2. Description of the Prior Art

Many different types of balancing schemes are known to those skilled in the art. When rotatable objects are not in perfect balance, nonsymmetrical mass distribution creates out-of-balance forces because of the centrifugal forces that result from rotation of the object. Although rotatable objects find use in many different applications, one particular application is a rotating drum of a washing machine.

U.S. Pat. No. 3,304,032, which issued to Yapes on Feb. 14, 1967, discloses a self-balancing support mechanism that includes a cabinet designed to receive a washing machine. One side of the cabinet is provided with a strap member which extends across the lower end of the cabinet and includes a pair of space upwardly diverging slots. The invention also provides a mounting leg for operative attachment of the strap. The mounting leg includes an elongated, generally horizontal central portion with one of a pair of downwardly extending support feet formed at each end thereof. The mounting leg includes a pair of spaced threaded holes and an attachment stud is securely threaded into each of these holes and extends through a cooperating one of the slots. When the machine is mounted on a base surface, the weight of the machine causes the studs to slide within the slots until the machine assumes a position in which the weight distribution among the various support contact members or feet is balanced.

U.S. Pat. No. 3,275,146, which issued to Severance et al on Sep. 27, 1966, describes a laundry machine with an improved balancing mechanism. It relates to washers and dryers of the horizontal axis drum type in which it is desirable to have the rotatable cylinder rotate at a speed as high as practicable during extraction of liquid from clothing. As is well known, any unbalanced condition in the load within the drum causes serious vibration conditions. The mechanism provides application control means that are operatively connected between the rotatable drum mounting means and the support means of the machine including a relatively thin leaf spring member which is alternately placed in tension and compression to control water balancing and clutch control functions. The device described in U.S. Pat. No. 3,275,146 is an improvement of the means for overcoming imbalance and vibration that are disclosed in U.S. Pat. No. 3,151,067.

U.S. Pat. No. 3,149,502, which issued to Caruso et al on Sep. 22, 1964, discloses an automatic balancing apparatus. The invention relates to an apparatus for continuously balancing a rotor while the rotor is rotating. It provides means to produce a signal that is indicative of the dynamic unbalance of the rotor while rotating. Electrically responsive balancing means are positioned on the rotor to vary the dynamic characteristics of the rotor. Means are connected to the signal producing means to energize the electrically responsive balancing means in accordance with signals received from the signal producing means in a manner to thereby vary the dynamic characteristics of the rotor to continuously tend to counterbalance dynamic unbalancing forces in the rotor during rotation. The apparatus comprises several modifications over previous balancing techniques. In one, portions of the rotor are electrically heated to change the dynamic characteristics of the rotor and, when such heating is selectively performed, the dynamic characteristics of the rotor may be changed to continuously tend to counterbalance any dynamic unbalancing forces in the rotor during rotation. Another modification comprises a pair of balancing members positioned on the rotor to be balanced. The balancing members can be dynamically unbalanced by relative movement between the members and, by changing the angular relationship between the two balancing members, the dynamic characteristics of the rotor to be balanced may be varied to continuously counterbalance any dynamic unbalancing forces in the rotor during rotation.

Previous methods for dynamically balancing a rotatable member have experienced severe limitations in the degree of balance that can be achieved and in the rotational speeds under which they are workable. In addition, previous balancing methods have based their operation on certain assumptions that minimize the need for certain sensed parameters, e.g., the support of the equipment being balanced is rigid and rigidly fastened to a significant mass such as a concrete slab. It would therefore be beneficial if a dynamic balancing scheme could be provided which accounts for both forces and motion caused by an imbalance condition of the rotor.

SUMMARY OF THE INVENTION

The present invention makes possible a dynamic balancing procedure that accounts for both forces and motion that are imposed on a rotating member such as the drum of a washing machine.

A balancing system made in accordance with the present invention comprises a rotatable member having a shaft attached to it and supported by a free standing stationary member. The system also comprises a first means for measuring a first force at a first location of the system and a second means for measuring a second force at a second location of the system. Third means is provided for measuring a first absolute motion, via acceleration, at a third location of the system and a fourth means is provided for measuring a second absolute motion, via acceleration, at a fourth location of the system. The system also comprises a first means for placing a first counter weight at a first preselected location of the rotatable member and a second means for placing the second counter weight at a second preselected location of the rotatable member. The system comprises a means for determining the first and second preselected locations of the rotatable member as a function of the first and second forces and the first and second accelerations.

In a particularly preferred embodiment of the present invention, the determining means comprises a means for performing a singular valued decomposition calculation, in conjunction with the application of certain system constraints, to determine the appropriate first and second preselected locations of the rotatable member where counterbalance masses should be applied. Although it should be understood that the two force measurements and two absolute motion, or acceleration, measurements could be made at four individual locations of the system, a preferred embodiment of the present invention measures the first force and the first acceleration at locations which are along the shaft of the rotatable member coincident with each other and it measures the second force and second acceleration at locations that are along the shaft of the rotatable member coincident with each other.

In a particularly preferred embodiment of the present invention, the first and second means for measuring the first and second forces can employ a plurality of force sensors that are used in conjunction with each other. In other words, one embodiment of the present invention could employ two force sensors placed 90 degrees apart around the shaft each providing a force vector, measured in pounds of force with associated rotatable member angle, and together representing the effects of the force along different axes of the system, determined for both the first and second locations of the shaft. In addition, the acceleration measurements could be performed with more than one accelerometer at each location.

The sensor information needed for balance control can be provided by many different sensor combinations and locations of the sensors on the machine. Balance information needed for control can be obtained by a combination of force sensors and acceleration sensors or by a combination of acceleration sensors. The quantity, type, and location of the sensors needed on the machine for balance control can either be determined experimentally or theoretically. Determination of the appropriate combination of sensor types, quantities and locations involves several factors including dynamics of the machine and various floor installations, balance control criteria and balance control implementation constraints due to the counterbalance placement mechanism, and other factors.

Although the present invention is applicable for use in dynamically balancing many different types of rotating members, it is particularly suitable for balancing the rotating drum of a washing machine or centrifuge type applications. In addition, although many different means can be provided for placing the first and second counterweights at the first and second preselected locations of the rotatable member, one system is particularly applicable for use in conjunction with the present invention. One system comprises a plurality of liquid containment vessels in two axial planes of the rotating member. With appropriate plumbing and timing means, liquid is strategically placed in the liquid containment vessels to create a counterbalance weight at preselected locations at the axial ends of the rotating member. The present invention will be described below in conjunction with a preferred embodiment that has been tested in conjunction with the liquid containment vessel arrangement. However, it should also be understood that alternative means can be used to place the weights at the first and second predetermined locations on the rotatable member. U.S. Pat. No. 3,149,502, described above, illustrates one means for providing moveable weights that are attached to the rotatable drum. It should be understood that many different means can be provided for placing the first and second counter weights at the first and second preselected locations of the rotatable member and the choice of these weight placing means is not limiting to the present invention.

BRIEF DESCRIPTION OF THE DRAWINGS

The present invention will be more fully and completely understood from a reading of the Description of the Preferred Embodiment in conjunction with the drawings, in which:

FIGS. 11, 12 and 13 show different views of a rotatable drum having first and second pluralities of cups.

DESCRIPTION OF THE PREFERRED EMBODIMENT

Figure 1:
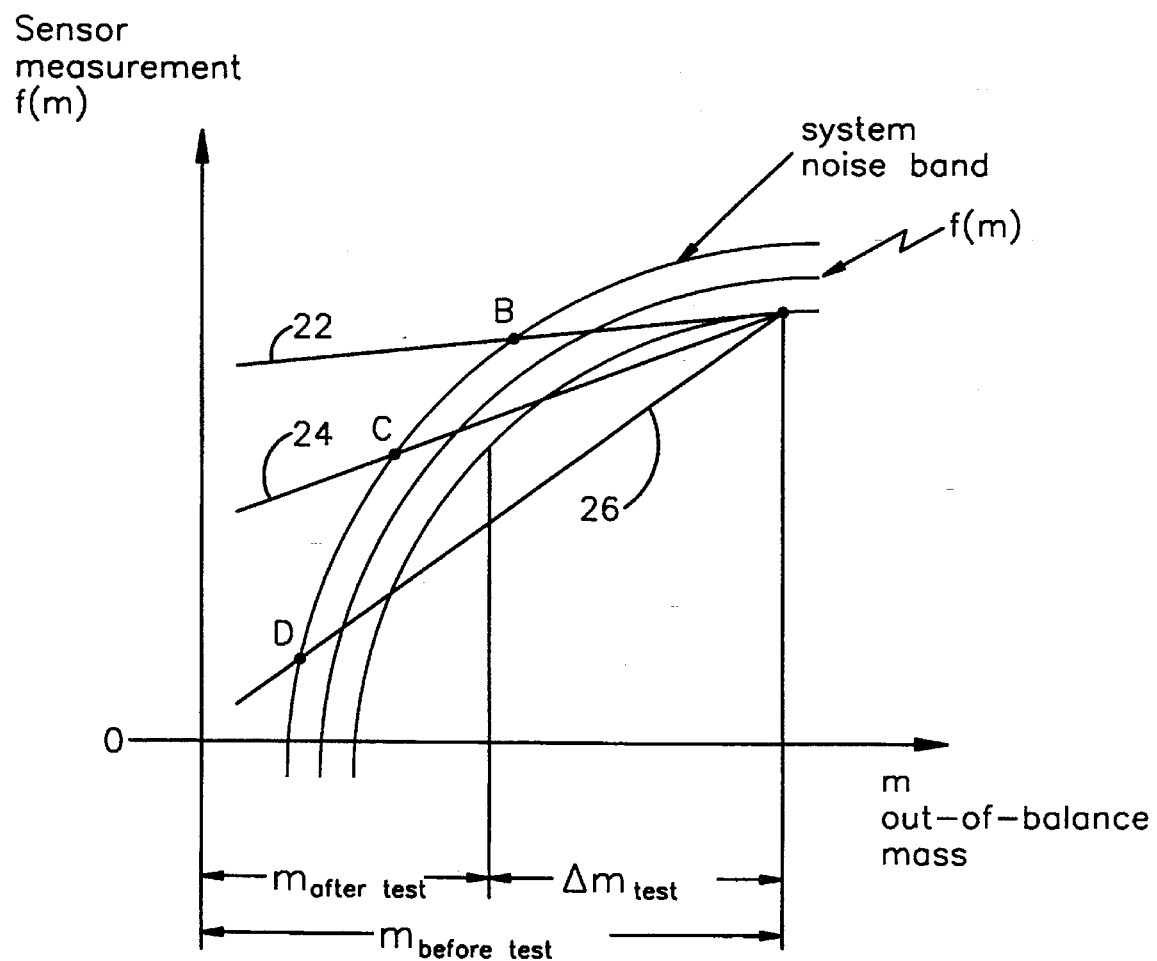
FIG. 1 is a graphical representation of a nonlinear system and the effect of system noise with which the present invention must be concerned.

Throughout the Description of the Preferred Embodiment of the present invention, like components will be identified by like reference numerals.

The present invention determines the appropriate location of counterbalance weights based on the resulting perturbation caused by a known change in the out-of-balance at predetermined locations of a rotatable member. This procedure is known as Newton Raphson iteration.

FIG. 1 is a graphical representation of a hypothetical non-linear system in which the system will be balanced when the sensor measurement f(m) is driven to zero. Therefore, the objective is to find an appropriate counterbalance mass so that the sensor measurement will be driven to zero. If it is assumed that a Taylor's series expansion in the vicinity of the anticipated operating range can be approximated by neglecting the second order and higher terms, the resulting linearized function is approximated by a straight line and can be written to reflect the example shown in FIG. 1. This relationship is expressed in equation 1.

$$f(m) \approx f(m_{aftertest}) + \left( \frac{\partial f}{\partial m} (m_{aftertest}) \right) \cdot (m - m_{aftertest}) \tag{1}$$

Where f(m) is the desired sensor measurement, $f(m_{aftertest})$ is the sensor measurement after placing a test mass, m is the counterbalance mass needed to achieve the desired sensor measurement of f(m), $m_{aftertest}$ is the out-of-balance mass after placing the test weight ($\Delta m_{test}$).

Because the objective is to find the necessary mass which will reduce the sensor measurement f(m) to zero, equation 1 reduces to equation 2.

$$m = m_{aftertest} - f(m_{aftertest}) / \left( \frac{\partial f}{\partial m} (m_{aftertest}) \right) \tag{2}$$

In equation 2, mass m is the solution that is necessary to drive the sensor measurement to zero. Thus the estimated mass change mcb that needs to be imposed on the system for counterbalance action is shown in equation 3.

$$m_{cb} = m - m_{aftertest} = -f(m_{aftertest})/\left(\frac{\partial f}{\partial m}(m_{aftertest})\right) \quad (3)$$

The partial derivative, or slope, is found by perturbing the system. This is shown in equation 4 which represents the change in sensor measurements due to placing the test weight ($m_{aftertest} - m_{beforetest}$).

$$\left(\frac{\partial f}{\partial m}(m_{aftertest})\right) = \frac{f(m_{aftertest}) - f(m_{beforetest})}{m_{aftertest} - m_{beforetest}} \quad (4)$$

Equation 4 defines the slope from point A to B that is shown in FIG. 1. Combining equations 3 and 4 results in a generalized form shown in equation 5, to be used below in an expanded notion of multiple inputs and outputs.

$$f(m_{aftertest}) = -\frac{f(m_{aftertest}) - f(m_{beforetest})}{m_{aftertest} - m_{beforetest}} \cdot m_{cb} \quad (5)$$

Regarding the slope calculation in FIG. 1, it can be seen that a change in the mass will result in a change in the system from point A to point B. If those two points are used to determine the appropriate next additional counterbalance, a significant error could occur because of the non-linearities of the system. Therefore, when applying the Newton Raphson iteration to a process, certain requirements should be followed. First, the initial approximation should be sufficiently accurate to result in subsequent operation near the desired solution and the measurement f(m) being smooth, slow varying and single-valued in the vicinity of the anticipated operation. In addition, since higher derivatives of force are neglected in this type of approximation, the higher derivatives should be small so as to avoid convergence problems. Lastly, in applications of the Newton Raphson iteration, only one solution of mass m should exist for the sensor measurement being equal to zero. This means that the solution should have only one root. Even after following the above requirements, system noise may be a concern. FIG. 1 illustrates the reason why the test mass should be sized according to the type of system in which the present invention is to be used. In the hypothetical illustration of FIG. 1, a larger initial test weight, which changes the system to point C, is preferable to the one that changes it to point B. This can be seen by comparing the slopes of lines 22, 24 and 26 that result from the various test mass perturbations represented in FIG. 1. The difference between the before and after test measurement should be large enough to obtain a good approximation of the slope of the function, and insure that the resulting change in the measurement dominates the changes due to system noise.

Figure 2:
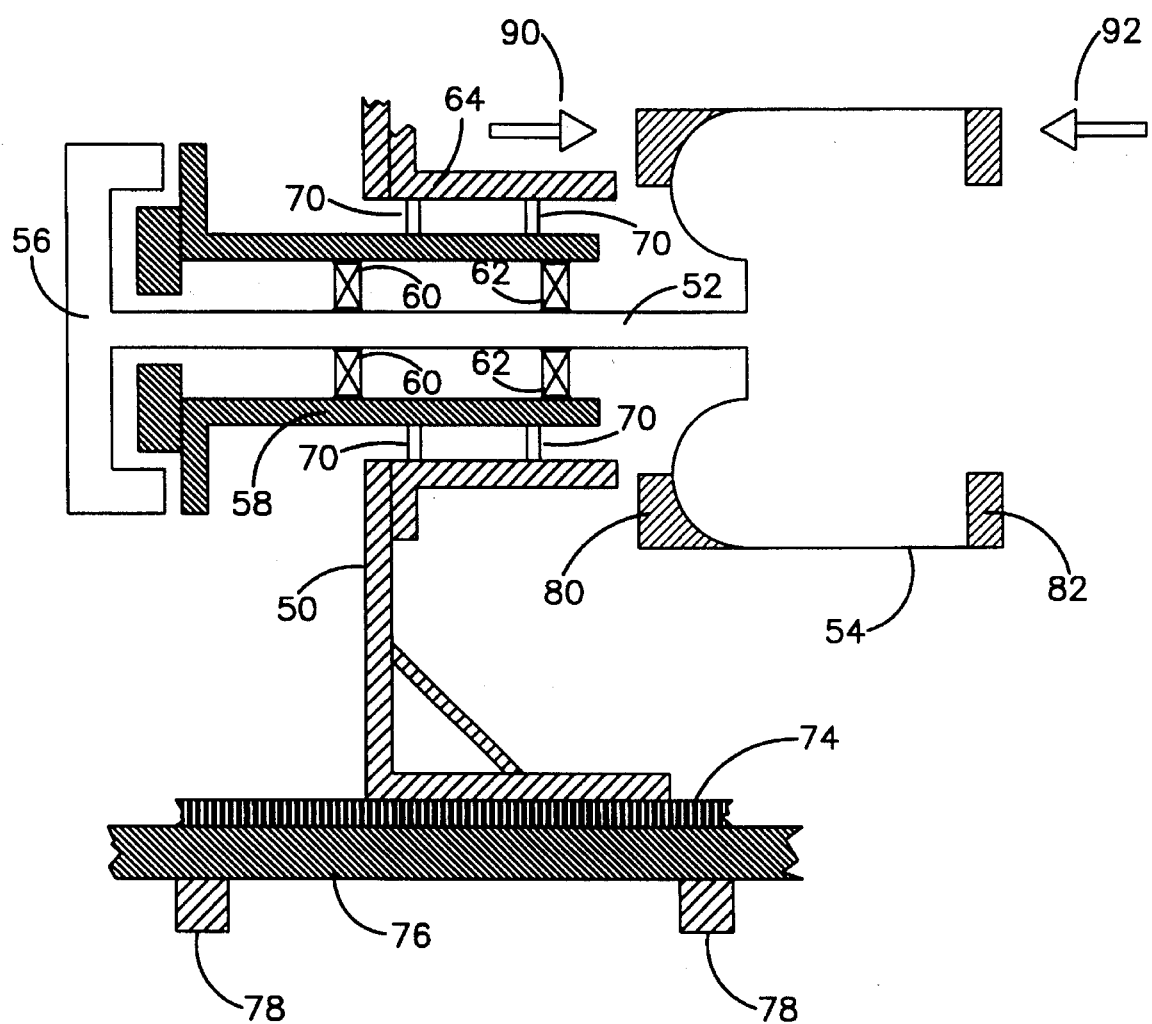
FIG. 2 is a schematic representation of a washing machine adapted for use in conjunction with the present invention.

In order to describe the preferred embodiment of the present invention in greater detail, it will be described in conjunction with a particular application that comprises a washing machine. The basic concept for dynamic balancing as implemented by the present invention involves counter balancing the out-of-balance load by injecting water into a plurality of cups placed at the front and back axial planes, identified be reference numbers 80 and 82 in FIG. 2, of the rotatable drum. FIG. 2 schematically illustrates a washing machine that comprises a frame 50, a shaft 52 and a rotatable drum 54. The shaft 52 is attached to the rotatable drum 54 and these two components are attached to a rotor or pulley 56 of a motor drive. The frame 50 provides support for a bearing housing 58 in which bearings, 60 and 62, are supported. A housing mount 64 supports the bearing housing 58. Shown between the housing mount and the bearing housing in FIG. 2 are a plurality of sensors which are identified by reference numeral 70. These sensors will be described in greater detail below. Beneath the frame 50 are shown a carpet and pad 74, a plywood support member 76 and a plurality of joists 78. The representation shown in FIG. 2 illustrates a typical application of a horizontal washing machine in a residential housing application.

With continued reference to FIG. 2, the rotatable drum 54 is shown having a plurality of schematically illustrated back cups 80 and front cups 82. Both the front and back cups are disposed at axial ends of the rotatable drum 54 and, although not shown in FIG. 2, both the front and back cups comprise a plurality of cups dispersed around the periphery of the drum that are capable of retaining a quantity of water that is injected into the cups from a stationary control valve supplied with water such as those identified by reference numerals 90 and 92.

Figure 3:
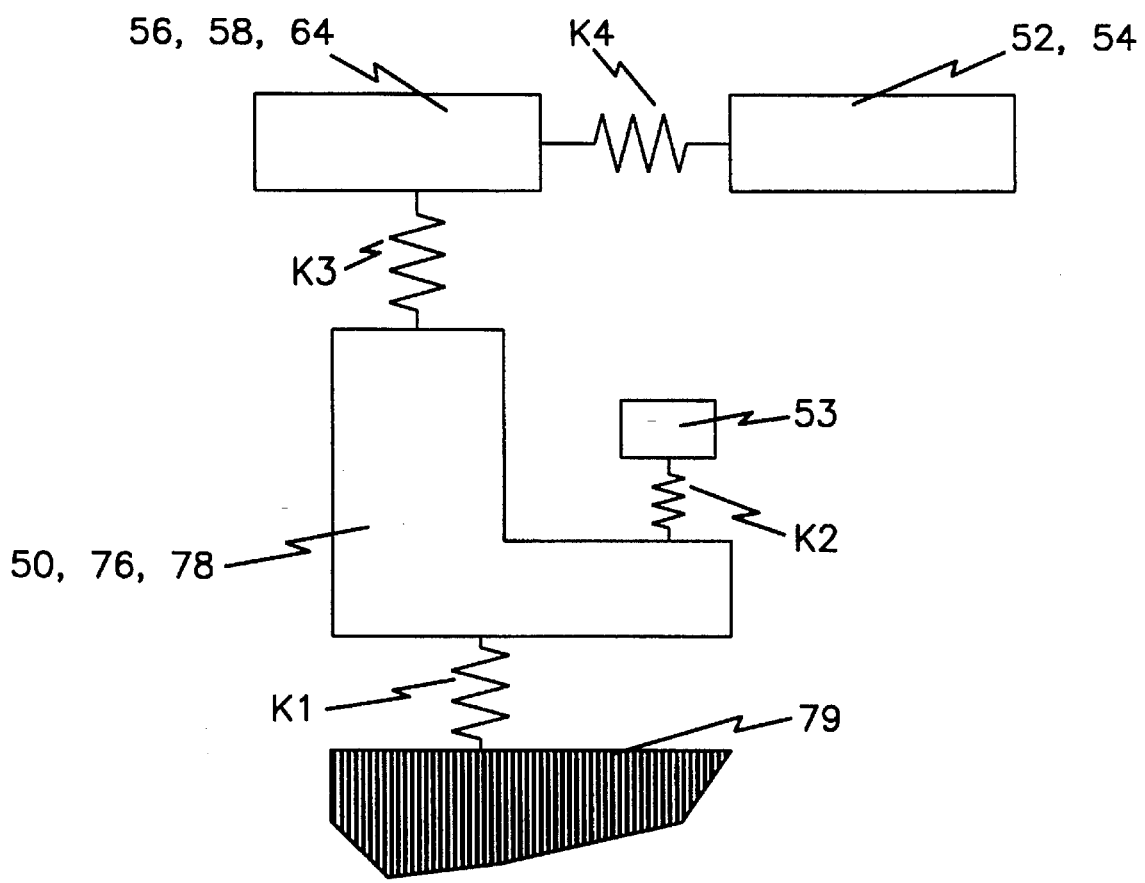
FIG. 3 is a spring and mass illustration showing the manner in which a nonrigid washing machine can behave if mounted on nonrigid structures.

FIG. 3 illustrates a simplified schematic mass and spring representation of a washing machine such as that shown in FIG. 2. Some balancing systems assume that the machine is attached rigidly to an immovable object or footing, such as a concrete floor. However, in most practical residential housing applications, the machine is not rigidly attached to an immovable object and, instead, is associated with a plurality of members which are flexible. As an example, FIG. 3, shows a schematic representation of the type of arrangement which usually occurs in the case of washing machine applications. The behavior of the frame 50 in relation to the footing 79 can be described as a spring representing the frame 50 and floor 76 and having a spring constant K1. The relationship between the tub 53 (not shown in FIG. 2) surrounding the rotatable drum 54 and the frame 50 can be described by a spring constant K2. The spring constant K3 represents the relationship between the bearing housing 58 and housing mount 64 combination, and frame 50 in FIG. 2. Lastly, FIG. 3 shows a spring constant K4 that represents the bending of the shaft 52 along with the rotatable members 54 and 56. Although only represented by boxes in FIG. 3, the schematic illustration shows the multitude of mass-spring subsystems defining the relationships between major components of the overall system. The purpose of FIG. 3 is to show that the relationships between these components are not rigid and, as a result, will permit motion, resulting in accelerations, to occur in response to forces exerted on the various components. Therefore, if the system is not rigid and only forces are measured by the sensors 70 shown in FIG. 2, accurate counterbalance determinations would be extremely difficult, if not impossible, to make.

Figure 4:
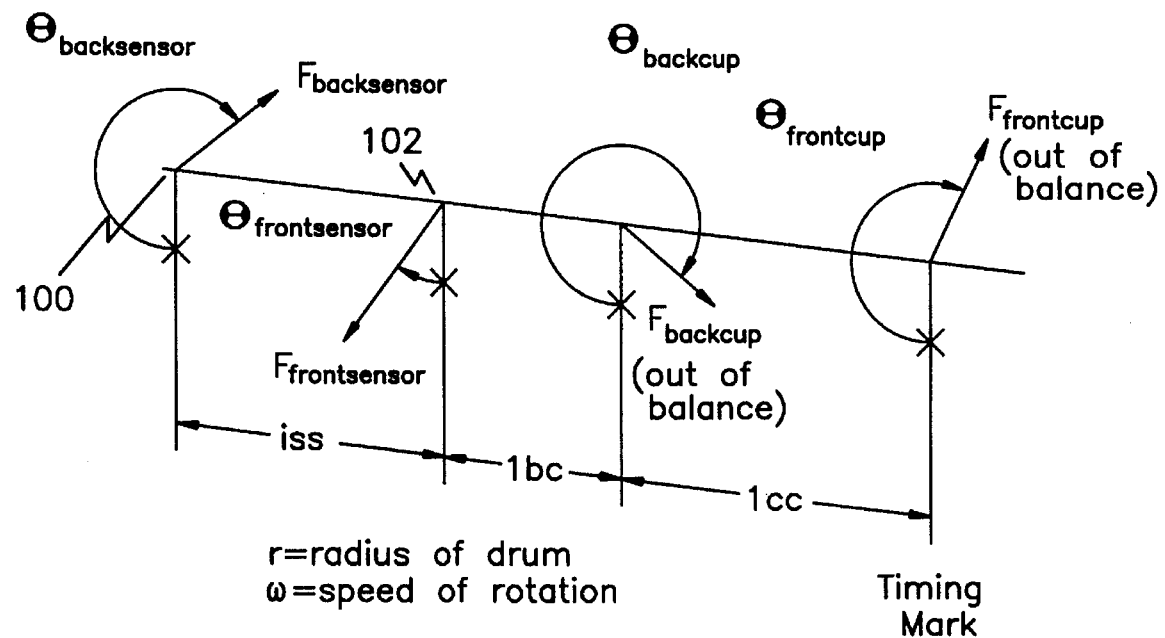
FIG. 4 is a graphical representation showing the locations of force moment arms and counterbalance vectors.

FIG. 4 is a three dimensional schematic representation of the forces and critical lengths along the axis of rotation, which has been extended along the length of the shaft and through the length of the drum. Force sensors are mounted to measure the force transmitted between the housing mount 64 and the bearing housing 58 as illustrated in FIG. 2. The basic concept for dynamic balancing stipulates that the out-of-balance can be represented by vector forces at the front and back cups. Referring to FIG. 4, the system is provided with a means for sensing a first force $F_{backsensor}$ at a first location 100 of the axis of rotation and a second means for measuring a second force Ffrontsensor at a second location 102 of the axis of rotation. It should be understood that both the first and second forces shown in FIG. 4 are likely to be determined from a plurality of force sensors arranged so that the resultant force vectors along multiple axes of the system, can be determined at each of the first and second locations, 100 and 102, of the axis of rotation.

Figure 5:
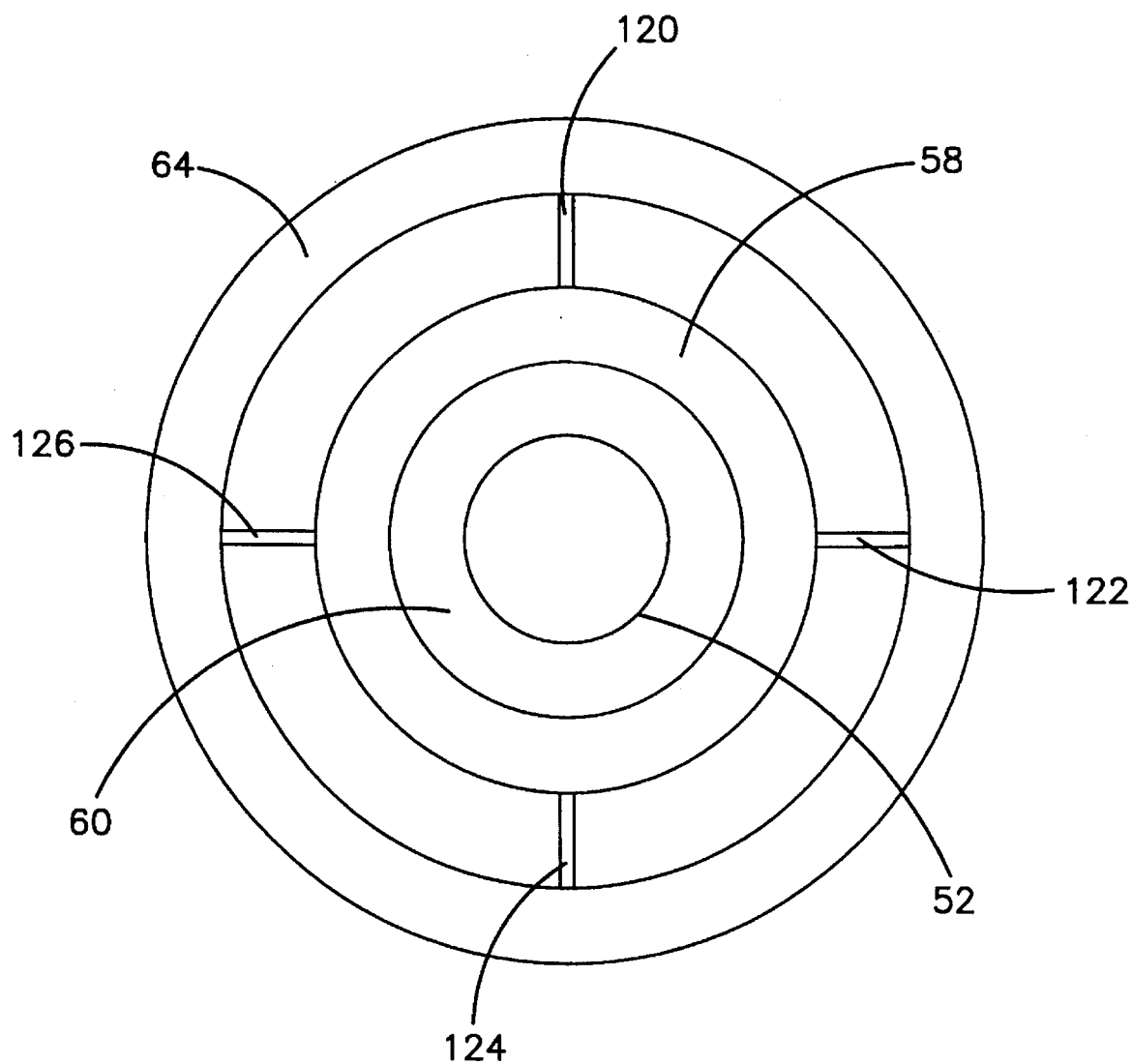
FIG. 5 is a sectional view showing force sensors associated with a shaft and bearing housing of a rotatable member.

FIG. 5 illustrates a cross sectional view of a location on the shaft where the forces are measured according to one embodiment of the present invention. With reference to FIGS. 2 and 5, it can be seen that a shaft 52 is supported by bearings 60 which, in turn, are supported by a bearing housing 58. Between the bearing housing 58 and the housing mount 64, four force sensors, identified by reference numerals 120, 122, 124 and 126 can be located. When not present, a force sensor can be replaced by a support pin. The measured front and back sensor forces are used to determine the out-of-balance forces at the front and back cups via balanced force and moment equations (i.e., sum of forces and sum of moments should equal zero) for the rotating system of FIG. 4. By selecting the point about which to take moments as the axial location of the front cups, the forces at the cup locations can be resolved from the force sensor measurements and distances shown in FIG. 4. Equation 11, discussed below, shows the matrix form of the balanced force and moment equations for the rotating system of FIG. 4. The measured out-of-balance at either the front or back cups can then be counterbalanced by injecting water into the cups of the front and back planes of the drum. Both the first and second measured forces, $F_{backsensor}$ and $F_{frontsensor}$ are vector magnitudes which incorporate both a magnitude and an angular direction associated with the rotating drum. Similarly, the counterbalance forces provided by the water in the cups are placed to achieve a balanced condition by injecting a preselected mass of water into the cups at angular positions on the rotating drum that will result in vectors that minimize the forces on the shaft. If a washing machine or similar apparatus with a rotating member is rigidly attached to an unmovable object, such as a concrete floor, in such a way that movement of the machine was prevented, a mere force and moment analysis based on forces and moment arms shown in FIG. 4 would be appropriate and could yield sufficient information to allow the counterbalance forces to be implemented in a manner that would achieve a balance of a rotating drum 54. However, as discussed above in conjunction with FIGS. 2 and 3, it is not practical to expect a machine of this type to be installed and operate without motion, measured via accelerations, being experiences by the various portions of the machine. Therefore, it is beneficial to measure motion relative to a footing or inertial space (e.g., acceleration) and account for it in the analysis of forces.

Figure 6:
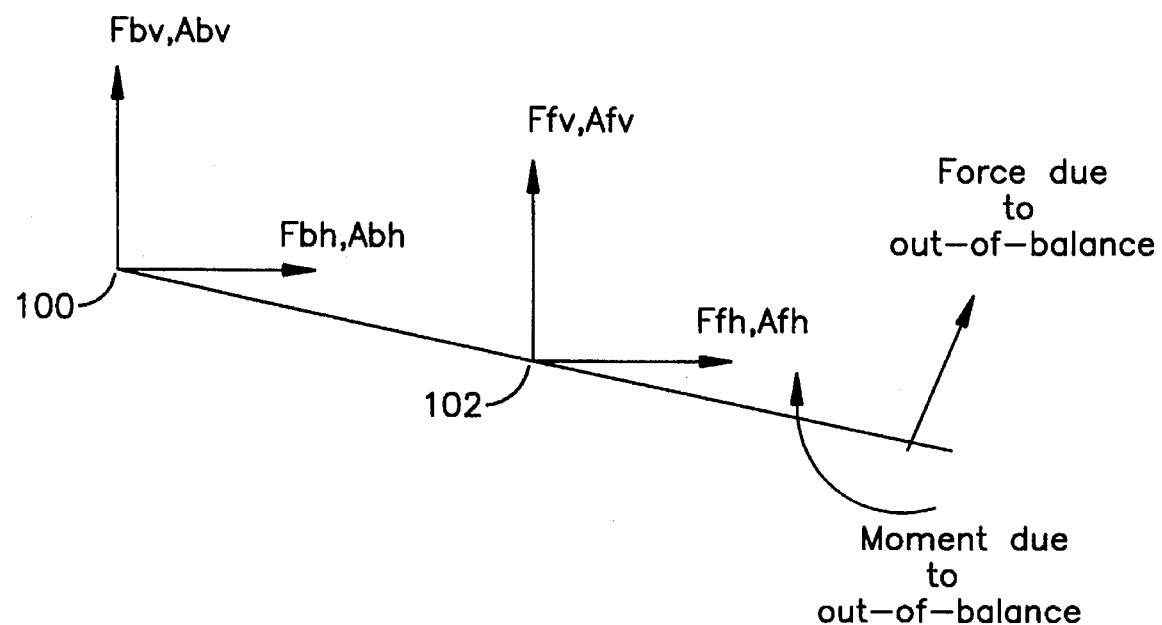
FIGS. 6 and 7 show a graphical representation of a shaft with measured forces and accelerations illustrated.
Figure 7:
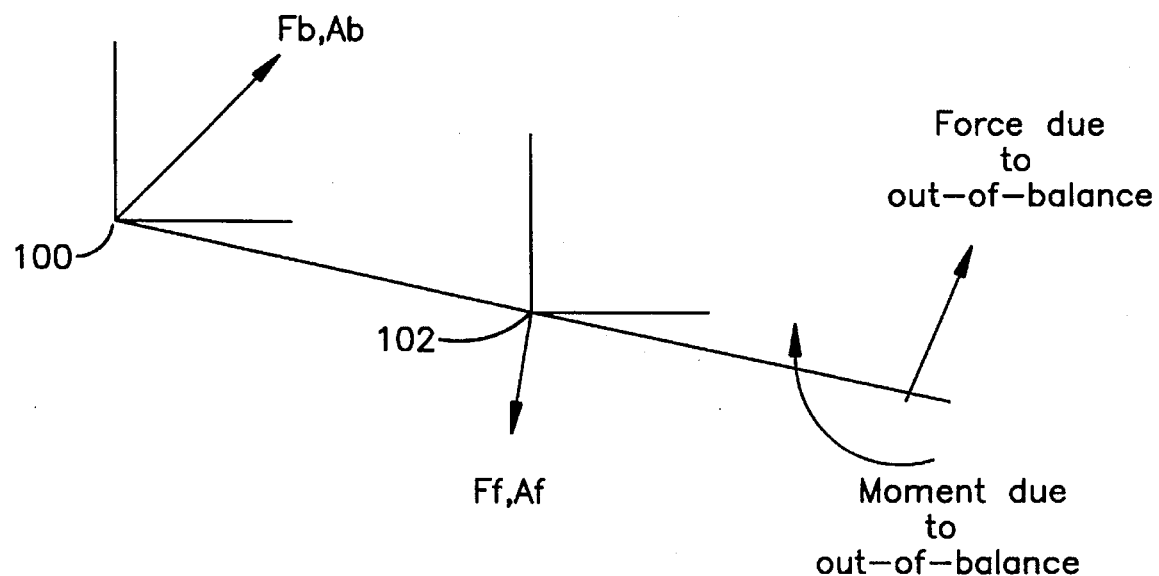

FIGS. 6 and 7 show the measurement of forces and accelerations in three dimensional space at various locations along the shaft 52. Viewing FIGS. 6 and 7 together, it can be seen that the forces and accelerations can be measured at two coincident locations on the shaft 52. However, it should also be understood that this coincidence of the first force and the first acceleration or the second force and the second acceleration are not requirements of the present invention. At each of the first and second locations, 100 and 102, the effects of rotating out-of-balance forces are determined along the horizontal (h) and vertical(v) coordinates. It should be understood that these coordinates are illustrated in FIGS. 6 and 7 to represent the fact that the present invention operates on information that describes the forces in terms of both a magnitude, a fixed direction and an associated rotating drum angle. Similarly, the accelerations are also expressed as a magnitude along a fixed direction with an associated rotating drum angle.

TABLE I

| VARIABLE | MEANING |
|---|---|
| Inputs | |
| $\Delta m_{front\_cb}$ | test counterbalance mass placed in the |

TABLE I-continued

| VARIABLE | MEANING |
|---|---|
| | front plane (vector) |
| $\Delta m_{back\_cb}$ | test counterbalance mass placed in the back plane (vector) |
| $\omega_{back}$ | speed of rotation in (rad/sec) at which the back plane test counterbalance occurred |
| $\omega_{front}$ | speed of rotation in (rad/sec) at which the front plane test counterbalance occurred |
| r | radius of counterbalance placement (inches) |
| $\omega$ | current speed of rotation in (rad/sec) |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero (vector) |
| $m_{frontplane\_cb}$ | estimated frontplane counterbalance to drive sensor readings to zero (vector) |

For the following discussion, Table I illustrates the inputs and outputs used in the multi-input/multi-output condition relating to the present invention. In order to find the appropriate solutions for the counterbalance forces described above in conjunction with FIG. 4, the measured forces and accelerations should be considered in the balancing of the system forces and moments. As described above, the counterbalance masses, forces and accelerations represent magnitudes and angles. Therefore, all variables shown in Table I, except r and $\omega$, consist of both a magnitude and an angle in polar coordinates which can be converted to complex coordinates. The relationship described in equation 5 above can be rewritten for the multi-input/multi-output case to result in four coupled simultaneous equations, incorporating the effects of perturbations in both front and back planes that could have occurred at rotational speeds slightly different from the current speed. These four relationships are shown below and are identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_ch} - \left(\frac{a_{back3} - a_{back2}}{r \cdot \omega_{front}^2 \cdot \Delta m_{front\_cb}}\right) \cdot r \cdot \omega^2 \cdot m_{frontplane\_ch}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_ch} - \left(\frac{a_{back3} - a_{back2}}{r \cdot \omega_{front}^2 \cdot \Delta m_{front\_cb}}\right) \cdot r \cdot \omega^2 \cdot m_{frontplane\_ch}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_ch} - \left(\frac{f_{back3} - f_{back2}}{r \cdot \omega_{front}^2 \cdot \Delta m_{front\_cb}}\right) \cdot r \cdot \omega^2 \cdot m_{frontplane\_ch}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_ch} -$$

(6)

$$\left( \frac{f_{front3} - f_{front2}}{r \cdot \omega_{front}^2 \cdot \Delta m_{front\_cb}} \right) \cdot r \cdot \omega^2 \cdot m_{frontplane\_cb}$$

The four relationships are grouped together as a single equation since they will be treated as a matrix in the following discussion. The meanings of the subscripts in equation 6 above are identified in Table II.

TABLE II

| SUBSCRIPT | MEANING |
|---|---|
| 0 | measurement prior to backplane counter-balance test mass $\Delta m_{back\_cb}$ |
| 1 | measurement after backplane counter_balance test mass $\Delta m_{back\_cb}$ |
| 2 | measurement prior to frontplane counterbalance test mass $\Delta m_{front\_cb}$ |
| 3 | measurement after frontplane counterbalance test mass $\Delta m_{front\_cb}$ |
| 4 | current sensor measurement |

The relationships shown above in equation 6 can be rewritten in matrix format to solve for the counterbalance masses, $m_{backplane\_cb}$ and $m_{frontplane\_cb}$, required to bring the system into balance. Since the test counterbalances in the front and back planes have already been conducted, the solution counterbalances in the front and back planes are calculated to drive the sensor measurements to zero. These calculations are identified as equation 7.

$$r \cdot \omega^2 \cdot \begin{bmatrix} m_{backplane\_cb} \\ m_{frontplane\_cb} \end{bmatrix} = -A^+ \cdot \begin{bmatrix} a_{back4} \\ a_{front4} \\ f_{back4} \\ f_{front4} \end{bmatrix} \quad (7)$$

In equation 7, $A^+$ is the pseudo-inverse of A. The matrix A is defined in equation 8.

$$A = -\frac{\partial f}{\partial m} \begin{bmatrix} m_{backaftertest} \\ m_{frontaftertest} \end{bmatrix} = \quad (8)$$

$$\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix}$$

Matrix A is not invertable because there are more equations than unknowns and an exact solution for equation 7 does not exist, thus leading to the use of the pseudo inverse of A.

Before describing the specific way in which the inversion of equation 8 is solved according to the present invention, it should be understood that if the system is assumed to be a rigid body that is rigidly attached to an immovable object, such as a washing machine bolted to a concrete floor, the acceleration or motion will be zero and equation 7 will reduce to the form shown in equation 9.

$$r \cdot \omega^2 \cdot \begin{bmatrix} m_{backplane\_cb} \\ m_{frontplane\_cb} \end{bmatrix} = -A^{-1} \cdot \begin{bmatrix} f_{back4} \\ f_{front4} \end{bmatrix} \quad (9)$$

$A^{-1}$ is the inverse of A. The matrix A is square so it can be inverted for typical values of its four entries. Matrix A is shown as equation 10 below.

$$A = -\frac{\partial f}{\partial m} \begin{bmatrix} m_{backaftertest} \\ m_{frontaftertest} \end{bmatrix} = \quad (10)$$

$$\begin{bmatrix} \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix}$$

For a rigid system with a truly linear relation between out-of-balance mass and sensor measurement, the slope of this line relation will remain constant for a particular sensor measurement and front or back test injection. In other words, the elements of the A matrix would become constant and continued test injections would produce a constant A and associated $A^{-1}$ matrix that, when expanded in the form of equation 9, represent the theoretically derived force and moment balance equation discussed above in association with FIG. 4. Therefore, the general case of equation 7 can be reduced to the theoretically derived force and moment balance equations for a rigid system. These equations are shown in matrix form by equation 11 where the $A^{-1}$ matrix elements are derived from the moment arms (1) shown in FIG. 4.

$$r \cdot \omega^2 \cdot \begin{bmatrix} m_{backplane\_cb} \\ m_{frontplane\_cb} \end{bmatrix} = \quad (11)$$

$$- \begin{bmatrix} \frac{(1_{cc} + 1_{bb} + 1_{ss})}{1_{cc}} & \frac{(1_{cc} + 1_{bc})}{1_{cc}} \\ \frac{-(1_{bc} + 1_{ss})}{1_{cc}} & \frac{-1_{bc}}{1_{cc}} \end{bmatrix} \cdot \begin{bmatrix} f_{back4} \\ f_{front4} \end{bmatrix}$$

In a situation where the system is not rigid such as that described by equations 7 and 8 above, where two accelerations and two forces are determined from measurements and two counterbalanced forces are determined, there are more equations than unknowns. Each sensor provides an equation while only two unknown counterbalance forces for the front and back planes of the drum are unknown. Therefore, the system is over determined and a technique is required that will solve for more equations than unknowns in an optimal manner. The technique for solving equations of this type in a balancing scheme should find the solution that will minimize all of the sensor readings and also minimize the required amount of counterbalance action needed to balance the rotating system. In other words, the force sensors and the accelerometers should all be driven as close to zero as possible by the selected counterbalances and the total amount of counterbalance actions taken should be minimized. The mathematical technique which solves this problem is the pseudo inverse and the singular value decomposition (SVD) which finds the optimal solution to the inconsistent system represented simply by equation 12.

$$Ax = b \quad (12)$$

Where A is a matrix, and x and b are vectors.

Throughout the description of the control system, repeated reference is made to the singular value decomposition technique or SVD. In a preferred embodiment of the present invention, this procedure is performed through the use of a library software program that was purchased from Dyad Software Corporation, 6947 Coal Creek Parkway SE, Suite 361, Renton, Wash. 98059-3159. This program is available in commercial quantities under certain licensing agreements and is suitable for performing the SVD computation described above. The SVD is one of several techniques to support the pseudo-inverse calculation for control. It provides optimal control for both inputs and outputs of the modeled system. Other variations of the components that make up the SVD could be used alone but would not provide both input and output optimization.

The singular value decomposition (SVD) technique finds the pseudo-inverse of a non-square matrix A. The SVD method is a robust technique and finds the optimal solution for x in equation 12 according to a method which is generally similar to a least squares technique. Once the pseudo-inverse is found using the SVD method, equation 7 can be solved. Because $A^{-1}$ is a pseudoinverse, no exact solution will exist for solving equation 12 and the optimal approximate solution in a least squares sense requires that the left side of equation 12 equals the perpendicular projection of the right side of equation 12 onto the range of A (i.e., a subspace of b that can be reached by linear combinations of the columns of A). Singular value decomposition combined with a technique of zeroing small singular values, to be described below, accomplishes this optimization, including the minimization of the solution x.

The singular value decomposition is a method by which A is factored into the elements shown in equation 13.

$$A=UWV^* \qquad (13)$$

In equation 13, the asterisk indicates the complex conjugate transpose of matrix V. The pseudo-inverse of A, $A^+$, can be computed from equation 14.

$$A^+=UW^{-1}U^* \qquad (14)$$

The pseudo-inverse defined in equation 14 minimizes the error E as identified in equation 15.

$$E=\|Ax-b\|=\|UWV^*x-b\| \qquad (15)$$

The techniques described above are well known to those skilled in the art and are described in significant detail in various reference linear algebra text books. The singular value decomposition technique is very stable and usually behaves in an appropriate manner to provide a solution to the problem described above.

Matrix W in equation 14 is a square diagonal matrix, thus equation 14 can be rewritten in the form of equation 16 where the elements of W, $w_j$, are known as the singular values. It is possible for one of the singular values, $w_j$, to be nearly zero or so numerically small that its value is dominated by round off error.

$$A^+=VW^{-1}U^*=V\cdot\{\text{diagonal }(1/w_j)\}\cdot U^* \qquad (16)$$

Since the pseudo-inverse of A is given by equation 16, it can be seen that it will be singular when $w_j$ is near zero or when $1/w_j$ approaches infinity. A matrix can also be singular, or ill-conditioned, if its condition number is too large or is infinite. The condition number of the W matrix is defined as the ratio of the largest singular value to the smallest singular value and it is important that a control strategy evaluate the $w_j$'s to determine if they are near zero or ill-conditioned. To find the pseudo-inverse requires computing the inverse of $w_j$'s and this would be infinity if any one of the $w_j$'s is near or equal to zero. To accommodate this, mathematically, it is possible to set the inverse $(1/w_j)$ of $w_j$ equal to zero for the $w_j$'s that are near or equal to zero. The effect is to discard one of the linear combinations of the matrix equations or to discard the equation set that is corrupted by round off error or an ill-conditioned matrix. After this is done, the solution for x is computed using the pseudo-inverse from equation 16. The control strategy of the present invention first evaluates all of the $w_j$'s for a near zero condition and then sets the inverse of those detected $w_j$'s to zero. In other words, if any of the $w_j$'s is less than a predetermined near-zero parameter, the inverse of that singular value is set to zero. The near zero parameter at a bare minimum is based on computer truncation and round off sensitivity, but more often is dominated by other much larger error sources such as sensor noise. The next step of a control strategy implementing the present invention is to determine the largest of the $w_j$'s and, based on a ratio parameter, to set the inverses of the non-qualifying $w_j$'s to zero. The ratio parameter determines the largest acceptable ratio of the largest of the $w_j$'s to the smallest of the $w_j$'s. In other Words, if any one of the $w_j$'s is less than a maximum value (i.e., $w_{max}$) divided by the ratio parameter, the inverse of that singular value, $1/w_j$, is set to zero. The ratio parameter has been set, in one particular embodiment of the present invention, to a value based on test results since the ill-conditioning is a function of sensor noise as stated earlier. Equation 12 represents an ideal case, but it should be realized that the values of x and b most likely contain some error value. This is represented by equation 17 where b is the sensor measurement and $\Delta b$ is the associated error.

$$A\cdot(x+\Delta x)=b+\Delta b \qquad (17)$$

Therefore, it can be shown that equation 18 is true where $\Delta b/b$ is the ratio of sensor error to sensor measurement. Therefore it can result in a 100 percent error or more in determination of x if equation 19 is true.

$$\frac{\|\Delta X\|}{\|X\|} \leq \frac{w_{max}}{w_{min}} \frac{\|\Delta b\|}{\|b\|} \qquad (18)$$

$$\frac{w_{max}}{w_{min}} \geq \frac{\|b\|}{\|\Delta b\|} \qquad (19)$$

For example, if a sensor signal has an error of 12 percent, and a magnitude of 1.0, the ratio of the sensor signal to the sensor error is approximately 8.5 and any value of $w_j$ which is less than $w_{max}$ over 8.5 will tend to provide a bad data signal, thus its inverse is set to zero.

In the discussion above, it was stated that the SVD technique minimizes the error identified in equation 15. This error can be further minimized if the A matrix and b vector of equation 12 are weighted by a weighing matrix T. The singular value decomposition technique applied to T*A gives a solution for x that minimizes the error as shown in equation 20.

$$\text{Error}=\|(TA)x-(Tb)\| \qquad (20)$$

Since there is not an exact solution, all of the sensor outputs can not be driven to zero. The elements of the weighting matrix T determine the relative importance which is placed on the sensor outputs.

In one prototype application of the present invention, a weighting scheme for normalizing sensor units is to use the balance criteria thresholds for weighting the elements. The balance criteria provides a relationship between the force and the accelerometers and are defined for each sensor, representing the sensor magnitude under which the machine is assumed to be balanced. Balance criteria are discussed in more detail below.

Before discussing further details of implementation, it is necessary to understand that the present invention permits a series of mass counterbalance corrections to be made to a rotatable member. Regarding the described embodiment and the construction of matrix A in equation 8, each counterbalance mass correction depends on a prior injection into the cups (reference numbers 80 and 82 in FIG. 2) and on the forces and accelerations measured before and after that prior injection. In a manner similar to that which was described above in conjunction with FIG. 1, the present invention begins the counterbalance procedure by separately injecting a known quantity of water at a known position in the first and second pluralities of cups, 80 and 82, and taking measurements of the forces and accelerations at the first, second, third and fourth locations of the shaft 52, before and after each of these initial injections. These measurements are taken to determine the degree of perturbation caused by the test injections. That perturbation along with further sensor measurement is used to determine the required correction counterbalance that will place the rotating assembly in a balanced condition. After each counterbalance injection is made, its perturbation effect can be used as a test injection for the next counterbalance calculation. The system is capable of recording all prior actions taken to balance the rotating member, thus the prior perturbation created by the latest counterbalance injection can be used under many conditions as the test injection for purposes of determining the next location and magnitude for a counterbalance injection. The criteria used by the present invention to determine whether or not prior injections can be used as test injections for purposes of the calculations will be described in greater detail below.

The application of the Newton Raphson iteration allows the determination of a counterbalance solution that will drive all of the sensors as close to zero as possible. Using the singular value decomposition mathematical technique permits the best approximate solution of a system which has more equations than unknowns. A particular application to washing machines has been used to present details where there is a potential for using past counterbalance actions as future test mass actions for determining matrix A in equation 8. In this regard, in an implementation of the present invention, it must be determined whether previous counterbalances have been performed for the front or back plane of the rotating member and it must be determined if those previous counterbalances qualify as test masses. If the previous counterbalance action cannot be used as a test mass, a test mass procedure should be performed and an estimate should be made to determine an appropriate test mass for the back plane, front plane, or both back and front planes of the rotating member. All of the sensors which measure both force and acceleration should be measured before and after each test mass operation. Next, the A matrix of equation 8 is formulated or updated, depending on whether test mass operations were performed on front, back, or both planes. Then matrix A is weighted by matrix T and the singular value decomposition process is then performed on the weighted A matrix to determine the U, V and W matrices of equation 13. The W matrix should then be evaluated to determine if it is singular or ill-conditioned by evaluating its elements, the singular values, and then redefining them, as defined earlier, if this is required. Next the pseudo-inverse of matrix A is determined as shown by equation 16 and, using the current sensor measurement vector, the magnitude and angle for the optimal counterbalance solutions for each plane are solved to drive the sensors to as close to zero as possible using equation 7. Once the optimal counterbalance solutions are determined for each plane, they are further scrutinized to determine the best counterbalance action that drives the sensors to a value as close to zero as defined by balance criteria and that meets the criteria for use as a future test injection and the constraints of the counterbalance actuators.

In an ideal system where the forces and accelerations are linearly related, the placement of the optimal counterbalances determined by the SVD should drive all of the sensors to zero and achieve perfect balance of the rotating member. However, because of various reasons, it is not expected that an ideal system exists. Therefore, the actual counterbalance magnitudes for both the front and back planes of the rotating member should be limited by several constraints. These comprise test mass constraints, threshold constraints, counterbalance actuator constraints, safety constraints and front/back plane ratio constraints. The test mass constraints and threshold constraints are related. The first test mass constraint relates to the fact that test masses should be large enough to provide a good approximation of slope, as described in conjunction with FIG. 1, but not so large that they cause additional out-of-balance complications in case of error due to sensor noise, mass placement error, etc. The second test mass constraint relates to the fact that as much overlap as possible between previous counterbalance actions and future test mass action is desired. The threshold constraints relate to the fact that balance criteria thresholds represent a narrow band, about the zero sensor measurement, defined by the positive and negative orientations of the threshold value. A counterbalance or test mass action which is too large could cause transitions through the threshold band, never allowing the threshold criteria to be met.

Another problem encountered is when counterbalances computed from equation 7 are invalid such as when entering resonance, etc. A method to address these problems is to take the next estimated counterbalance action computed from equation 7 and only administer a fraction of the suggested magnitude of the counterbalance action for driving the sensor measurements to near zero, and to gage the fraction based on how close or far the current sensor measurements are from their respective threshold levels. Typical relationships are shown in equations 21, 22, and 23. These relations apply to each sensor and the resulting fraction could be different for each sensor. However, only one factor is needed. An approach to resolve this is to determine the factor associated with each sensor and select the smallest factor, which will be associated with the sensor measurement that is the greatest multiple of its threshold level. Equation 24 uses the results of equations 21, 22, and 23 with equation 7 to provide the estimate for the next counterbalance or test mass action, represented by the mass vector on the left side of equation 24, that will meet the test mass and threshold criteria. The magnitude of the values computed from equation 24 for the front and back plane elements of the counterbalance or test mass limit the action the control strategy can accomplish for counterbalance. Because the results of equation 7 are used, logic should be incorporated into the above method that ensures the A matrix of equation 8 is recently determined and if it is not, then intercede with action that will allow it to be updated. This is discussed in more detail after the front/back plane ratio constraints are described. Overall, this method manages the risk of complicating the out-of-balance, provides counterbalance and test mass action interchange ability under most conditions, and utilizes threshold levels to get the most from each counterbalance action while meeting test mass and threshold constraints.

$$\text{If}(\|\text{sensor}\|_{\text{current}} \leq 2 \cdot \text{balance\_threshold}), \text{factor} = 1.0 \quad (21)$$
$$\text{If}(\|\text{sensor}\|_{\text{current}} > 2 \cdot \text{balance\_threshold AND} \quad (22)$$
$$\|\text{sensor}\|_{\text{current}} < 3 \cdot \text{balance\_threshold}), \text{factor} = 0.75$$
$$\text{If}(\|\text{sensor}\|_{\text{current}} \geq 3 \cdot \text{balance\_threshold}), \text{factor} = 0.5 \quad (23)$$

$$r \cdot \omega^2 \cdot \begin{bmatrix} m_{backplane\_cb} \\ m_{frontplane\_cb} \end{bmatrix}_{next} = (\text{factor}) \cdot (-A^+) \cdot \begin{bmatrix} a_{back} \\ a_{front} \\ f_{back} \\ f_{front} \end{bmatrix}_{current} \quad (24)$$

The counterbalance actuator constraints and the safety constraints will also affect the counterbalance limits. The counterbalance actuator can have limits of the smallest or largest counterbalance magnitudes it can accomplish on the rotational member at certain rotational speeds and there are safety concerns regarding the largest counterbalance magnitudes applied to an object rotating at high speeds. Generally, the actuator limitations and water extraction rate define the low limit and safety defines the high limit for counterbalance magnitudes. Therefore, the counterbalance actuator and safety limits will further constrain the desired counterbalance magnitudes that already meet the test mass and threshold constraints. In other words, if the counterbalance magnitude from equation 24 is less than the low limit of the counterbalance actuator, the counterbalance magnitude can be made equal to the low limit of the actuator. Next, the safety limit for the counterbalance magnitude is imposed. If the counterbalance magnitude from equation 24 is greater than the safety limit, the counterbalance magnitude is set equal to the safety limit. Both actuator and safety limits may be rotational speed dependent and this should be taken into account.

After all of the limits have been defined, the next step is to determine the counterbalance magnitudes that meet the limit requirements and still give the desired front to back plane magnitude ratios. Before any limits are applied to the results of equation 7, as discussed above, a ratio is established between the magnitudes of the front and back plane elements in the mass vector on the left side of equation 7. This front to back ratio should be maintained in order to properly address the moments of the out-of-balance and is defined by equation 25.

$$\text{front\_to\_back\_ratio} = \frac{r \cdot \omega^2 \cdot m_{frontplane\_cb}}{r \cdot \omega^2 \cdot m_{backplane\_cb}} \quad (25)$$

This ratio us used with the high and low limits discussed above in the following manner. With reference to equation 25, if the front to back ratio is greater than one and the numerator of the right side of equation 25 is greater than the high limit, the numerator of the right side of equation 25 is set equal to the high limit and the denominator of the right side of equation 25 is set equal to the high limit divided by the front to back ratio. If, on the other hand, the front to back ratio is less than or equal to one and the denominator of the right side of equation 25 is greater than the high limit, the denominator of the right side of equation 25 is set equal to the high limit and the numerator of the right side of equation 25 is set to the high limit multiplied by the front to back ratio. After all of the computations described immediately above are complete, the computed counterbalances are again checked against the high and low limits.

As mentioned above when describing test mass and threshold constraints, the A matrix of equation 8 must be kept up to date regarding progressive counterbalance actions and rotational speed changes. In a system such as that described in conjunction with equation 11, the slope or the values of the A matrix stay relatively constant. In a nonlinear system such as that shown in FIG. 1, the slope of the function varies and the values of the A matrix tend to change and the validity of its slope elements decays. For a fixed out-of-balance mass system, both out-of-balance force magnitude and angular location measurements change rapidly near a natural frequency of the system as the speed of the rotatable member changes. Depending on the nature of the resonance at the natural frequency, the response of the sensors to a fixed magnitude counterbalance action may be several times larger than the sensor response to the same fixed magnitude counterbalance action at a rotational speed far from the natural frequency. When the speed differs significantly from the natural frequency, the slope is again relatively constant. Based on this knowledge, the A matrix of equation 8 should be regularly updated to adequately represent the system. One method of accomplishing this is each time the control strategy enters a new speed, or after the speed has been increased by so much, a counterbalance action is first required in the front and back planes of the rotatable member to be used as test mass actions, accounting for the possible system variation and providing information to update the A matrix. Once the front and back plane counterbalances have been performed, the control strategy permits several consecutive counterbalance actions to be performed in a particular plane, allowing only one column of the A matrix to be updated, before the control strategy forces counterbalance placement to switch planes so that the other column of the A matrix receives an update. The quantity of consecutive test counterbalances performed in one plane is a function of how rapidly the A matrix validity decays without being updated and also on the front to back plane ratio requirements.

In the present invention, the enforcement of balancing is described in terms of counterbalance action or test mass action. For a particular embodiment, of the counterbalance action, this can be accomplished through, but not limited to, the injection of fluid into a plurality of cups around the circumference of the front and back planes of a rotating drum. Sensory information and the calculation of the counterbalance action with equations 7 and 8, along with the constraints that are applied to the solution, are described above for the general case where force and motion (i.e., acceleration) are considered. A special case of a rigid support structure on a rigid base has been presented in conjunction with equations 9 and 11. In all cases, as shown in equations 7, 9, 11, and 24, the result is a corrective action vector of the form shown at the right most portion of equation 26. The elements of the vector in equation 26 are in complex coordinates, each having a magnitude and angle. Multiplication by the radial distance, r, from the axis of rotation to the location of the counterbalance actuation means and by the squared rotational speed, $\omega^2$, in squared radians per second, show that the actual solution is in terms of corrective radial forces with magnitudes and angular locations on the rotating member, needed in the front and back planes of the rotating member. These corrective forces should then be transformed into information that can be used by the counterbalance actuation means. For the preferred embodiment described above, corrective forces should then be transformed into an amount of fluid to be injected and the span of cups to employ. This is accomplished by first characterizing the mass flow rate of the injector valves, 90 and 92 in FIG. 2. The required front and back plane mass is obtained by dividing the magnitude of the vector elements in equation 26 by $r\omega^2$ and making trigonometric corrections to the mass value due to the span versus single point placement in the cups. Finally the speed of rotation, the mass flow rate of the valve, the corrective mass value, and the desired angular span for injection into cups are used to determine how long to turn the injector on and the number of revolutions to repeat the injection action. The actual angular placement of the injection uses the angular information from the vector elements in equation 26, along with a timing mechanism for determining drum position relative to injector location, to center the injection span about the angles from equation 26. As mentioned above, this counterbalance placement technique is not limiting to the present invention and many different techniques are suitable for use in conjunction with the present invention.

$$\text{corrective\_action\_vector} = r \cdot \omega^2 \cdot \begin{bmatrix} m_{backplane\_cb} \\ m_{frontplane\_cb} \end{bmatrix} = \begin{bmatrix} r \cdot \omega^2 \cdot m_{backplane\_cb} \\ r \cdot \omega^2 \cdot m_{frontplane\_cb} \end{bmatrix} \quad (26)$$

Relevant to the sensing aspect of the present invention is that the forces and accelerations of interest are actually rotating vectors. That is, they are fixed with respect to the rotating members of the system and rotating at the rotational speed with respect to the stationary members of the system. Thus, the desired information has a constant magnitude and angle regarding the rotating reference frame of the rotational members that is then superimposed by a periodic component regarding the stationary reference frame of the frame that supports the rotating members. In the preferred embodiment described above, the sensors for obtaining this information are attached to the stationary members as shown in FIGS. 2 and 5. It is important to understand that the present invention is not limited to this sensor attachment and that, depending on the dynamics of the system, not only could sensors be located on other parts of the stationary members but they could also be mounted on parts of the rotating members of the system.

The force and motion (magnitude and angle) information relative to the rotating reference frame are determined from sensors mounted on the stationary reference frame. Computing the sensor measurements in terms of the rotating reference frame requires knowing the angular position of the rotating reference frame with respect to the fixed reference frame at any instance in time. The angular position of the rotating reference frame with respect to the fixed reference frame, at an instance in time, can be determined from knowing the rotational speed and using a timing mark where the angle is equal to the speed (rad/sec) multiplied by the amount of time since the fixed timing mark sensor has passed by a mark on the rotating reference frame. The timing mark sensor can be any of several sensing mechanisms such as magnetic or optical sensing. Although not directly required by the control algorithm, information on the radial axis of the sensor measurement is critical to representing the full dynamics of the system to be balanced and is useful in developing a physical understanding of the systems response to control actions.

Next, consider the signals from the sensor measurements. These signals are comprised of a sinusoidal waveform with a constant offset bias and corrupted by measurement noise as well as harmonically related system noise. The signal component of interest is the sinusoidal component at the frequency matching the speed of rotation. Known data acquisition techniques are used to acquire the data into a digital format, including AC coupling to eliminate the constant offset bias, amplification as needed, and low pass filtering to prevent aliasing in the event the data is digitized. The sensor signals are possibly still corrupt with noise which can be eliminated with a narrow band bandpass function that is tunable in real time to the speed of rotation. In addition to rejecting unwanted noise, the band pass function provides the benefit of rejecting external disturbances that can occur if the washing machine is shaken by some external force or the machine is vibrated by some source other than its own operation. The band pass function will not reject frequencies that are near the rotating frequency, such as another washing machine that is in contact with the machine being controlled and the other machine is operating at the same rotational speed. All signal conditioning should be implemented so as to introduce insignificant or known fixed delays to the sensed data. Certain aspects of the signal conditioning can be performed with analog or digital techniques. The preferred embodiment digitizes the data after the anti-aliasing low pass filter and performs the bandpass function digitally. The end result of signal conditioning is the sinusoidal component of the sensor signal, at the frequency of the rotational speed. It should be understood that the present invention does not depend on the particular means to condition the signals or the divisions between analog and digital techniques that are used. Many techniques to perform these functions are known to those skilled in the art and, therefore, excluding a brief discussion below on the digital implementation of the bandpass function, they will not be described in detail herein.

The sensed and conditioned sinusoidal components at the frequency of rotation from the sensors on the fixed reference frame and the angular relationship between the fixed and rotating reference frames and the angular position due to any known delays is used to compute the angle relative to the rotating reference frame at which the maximum amplitude occurred on the conditional sensor signal. Thus, the peak of the sinusoid is detected, its value determined, and the angular positions relative to the rotating reference frame when the peak amplitude occurred is determined. These angles and the associated values of the maximum amplitude (i.e., a magnitude and angle for each sensor) are the rotating vectors mentioned above and represent the complex sensor values used in equations 7 and 8. These complex sensor values are the out-of-balance parameters. Some or all of whose magnitudes will be compared against balance criteria thresholds to determine if further counterbalance action is required. Multiple axes of measurement are utilized because the system may not be symmetric, allowing for the possibility that out-of-balance forces and counterbalance action effect different axes of the stationary members in different ways, e.g., multiple modes of vibration.

Figure 8:
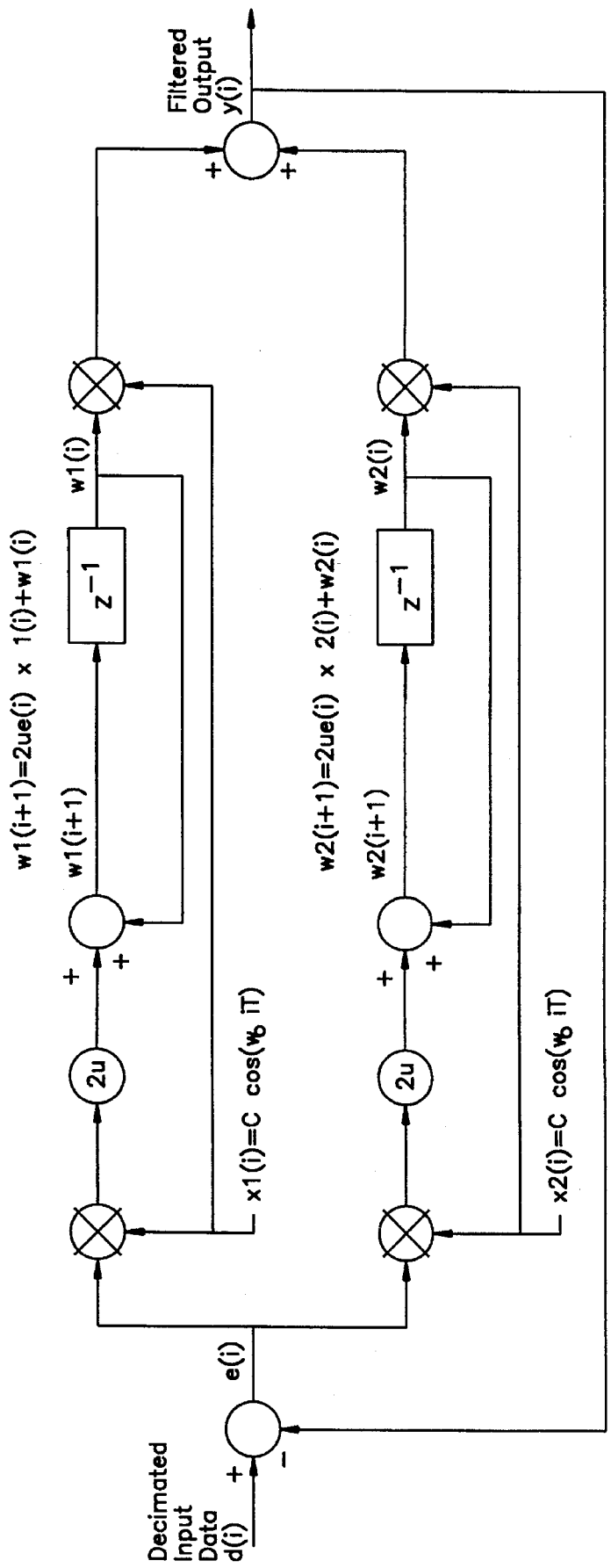
FIG. 8 shows the adaptive band pass filter algorithm in a graphical representation.

In order to achieve very narrow band performance with minimal delay, the desired bandpass function discussed above was implemented digitally. One particular implementation employs an adaptive band pass filter, referred to by those skilled in the art as an LMS adaptive interference cancellor. This filter is described in the text of a book titled "Adaptive Signal Processing" by Bernard Widrow and Samuel D. Sterns in 1985; pp. 316–323. The filter is an alternative for a conventional notch filter. A conventional notch filter would possibly be difficult to implement because of the wide range of rotational speeds possible in an implementation of the present invention. The adaptive band pass filter offers easier control of band width, an infinite null and the capability of adaptively tracking the exact frequency and phase of the interference. This capability permits the frequency of interest to be specified and the adaptive band pass filter will then extract only the information related to that frequency and ignore all other frequency information. The basic algorithm of the adaptive band pass filter is shown schematically in FIG. 8. The filter parameters include the adaptation factor $uC^2$ and the magnitude C of the reference cosine and sine waveforms. The adaptive filter generates reference sine and cosine waveforms for the frequency of interest, that is the speed of rotation, and in phase with timing marks picked up from the rotating member. It then computes the filter weights w1 and w2, based on the error between the raw data and the filtered data. If the adaptation factor is selected properly, the filter is relatively easy to implement. Those skilled in the art are familiar with the text written by Widrow and Sterns in 1985. Therefore, the adaptive band pass filter algorithm shown in FIG. 8 will not be described in significant detail herein. After the data has been filtered by the adaptive band pass filter, an angle detector identifies the angular location of the maximum peaks of the sinusoidal filter output relative to the timing marks mentioned above. The particular implementation of the angle detector is a zero cross angle detector. The objective of the zero cross angle detector is to identify when the sinewave crosses the zero axis. The advantage of detecting an angle crossing the zero axis over detecting the angle at its peak magnitude relates to the fact that a change in amplitude over 60 degrees of the peak is relatively small while the change in amplitude over 60 degrees of the sinewave as it crosses the zero axis is much larger. Therefore, the zero cross angle detector is more accurate than an peak angle detector. An angle of 90 degrees is either added or subtracted from the zero cross angle, depending on the slope of the signal when it crossed zero. Not all embodiments of the present invention require the use of the filtered result from the bandpass filter followed by an angle detector. An alternate method being used applies the adaptive filter of FIG. 8 through the computation of the adaptive filter weights, w1 and w2, and then determines the magnitude and angle of the desired frequency component from the input sensor signal by applying equations 27 and 28, where C is the amplitude of the reference sine and cosine waveforms. Yet another method being used takes the reference sine and cosine waveforms used in the adaptive filter, and simply performs a correlation between each and the input sensor signal, where the resulting amplitudes and angles are applied to equations similar to equations 27 and 28 to arrive at the desired magnitude and angle information. In both later cases, the need for angle detection has been eliminated. These techniques are familiar to those skilled in the art and, again, it should be understood that the present invention does not depend on the particular means to implement these functions.

$$\text{magnitude} = \sqrt{(w1 \cdot C)^2 + (w2 \cdot C)^2} \qquad (27)$$

$$\text{angle} = \tan^{-1}(w2/w1) \qquad (28)$$

Figure 9:
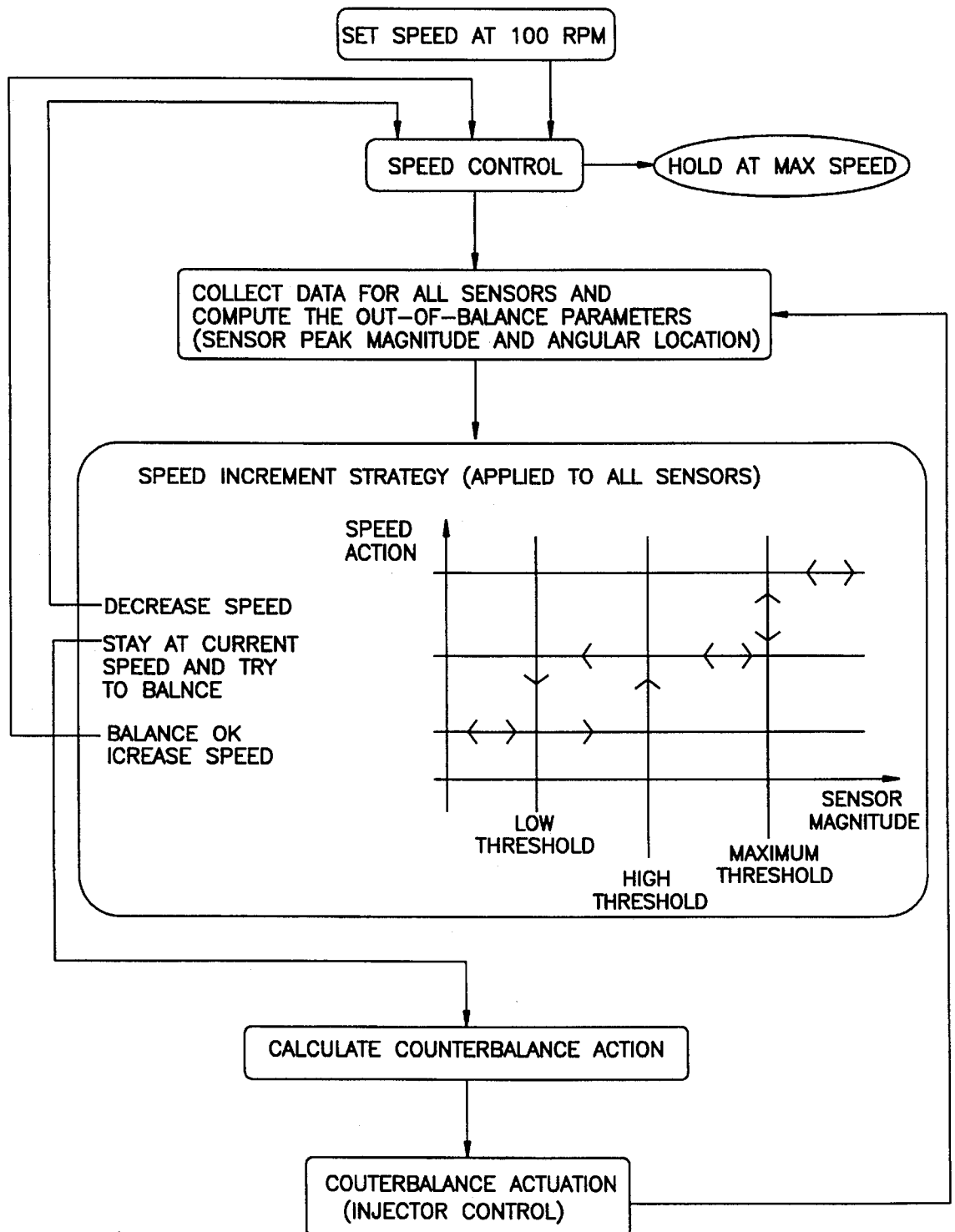
FIG. 9 is a flow chart representation of a serial implementation of a balance control algorithm.
Figure 10:
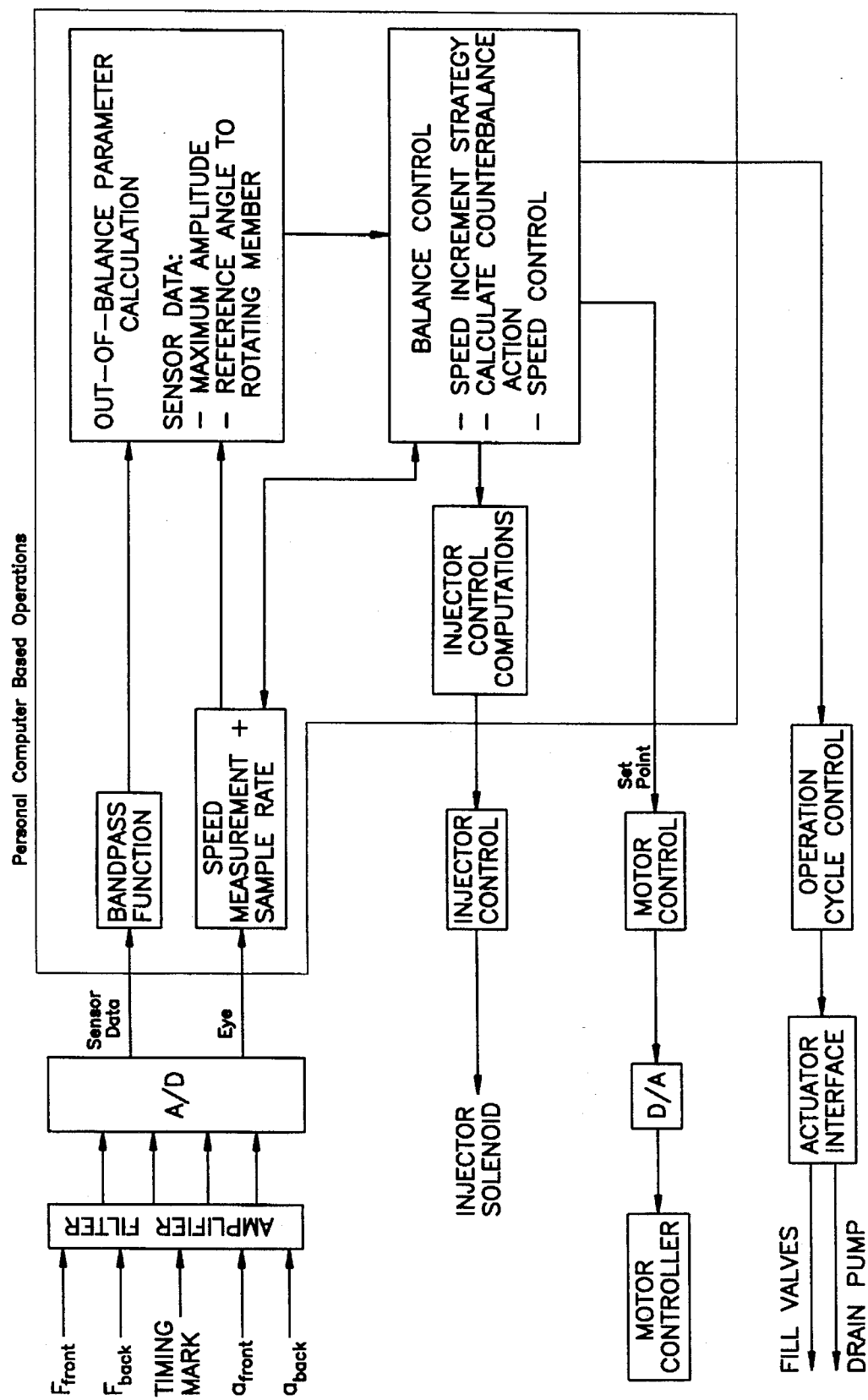
FIG. 10 shows the relationship between the spin cycle control strategy components.

When applied, the purpose of the present invention is to make measurements of a system's balance condition, and if out-of-balance exits, to correct the out-of-balance in an optimal way so as to allow further action. In conjunction with a particular application that comprises a washing machine, further action may involve increasing the speed of rotation as part of a spin cycle, wherein balancing may be performed after each speed increment due to changes in the load of the machine such as water loss from clothing or simply due to the increase in speed which has a power of 2 impact on radial forces ($mr\omega^2$). Under these conditions of a dynamically changing load, common to many extraction type applications, a strategy is required for combining the speed increase with the sensing, counterbalance calculation, and counterbalance actuation presented above as parts of the balancing functions. Although it should be understood that many control strategies can be used in conjunction with the present invention, the present invention will be described in terms of one preferred strategy. With reference to FIG. 9, the initial pass through the algorithm sets the rotational speed to 100 rpm and then data is collected using standard data acquisition equipment interfaced to a personal computer. When the data is collected, it is processed and the out-of-balance parameters are computed in terms of sensor magnitudes and angles for front and back plane sensors, possibly with multiple axes of measurement as described above. The control strategy determines whether it should perform a speed decrease, counterbalance operation or, alternatively, increase the motor speed. These decisions are implemented as a function of certain force and accelerometer thresholds. This function determines whether it should balance the rotating member by injecting water into the cups or whether it should cause the rotational speed to be increased or decreased. The back force sensor, front force sensor, back accelerometer and front accelerometer parameters and the previous balance mode (e.g., decrease speed, balance or increase speed) are compared against thresholds to make the decision whether to balance or change speed as illustrated in FIG. 9. The force and accelerometer thresholds are shown in FIG. 9. If the out-of-balance condition exceeds the maximum threshold, the rotational speed is reduced by fixed amounts until the out-of-balance condition is once again below the maximum threshold. If any of the force or accelerometer signals exceed the high threshold, the balance mode is set and a counterbalance operation is performed until the out-of-balance condition is brought below the low threshold. When the force and acceleration signals are below the low threshold, the speed is increased until the high threshold is exceeded. If the motor speed set point is changed, the set point is sent to the speed control algorithm. If balancing is required, the counterbalance parameters and counterbalance angles for the front cups and back cups are sent to the injector parameter calculation and control function. After the balancing is completed or a speed change is completed, data is again collected and the entire process is repeated. The individual components used to perform these functions are shown schematically in FIG. 10. This strategy can be implemented on a batch of collected data if a serial implementation of the present invention is used. However, the algorithms do not require batch data or off line processing and can be implemented on a sample-by-sample basis or in real time with a processor and data collection approach that is sufficiently fast. In the most optimal configuration of the present invention, at least one revolution of data should be processed to determine the injection parameters. Future development of the present invention could implement an investigation of methods which utilize a faster microprocessor combined with parallel data acquisition. Although many different ranges of speeds can be employed within the concept of the present invention, tests of a prototype have been performed in which the rotation speed is increased from 100 rpm to 1,000 rpm in fixed steps ranging from 5 revolutions per minute (rpm) to 40 rpm and in variable steps covering the same range.

As described above, the present invention implements a version of the Newton Raphson iteration which requires that an initial test mass be used to perturb the system and then estimates the necessary additional counterbalance mass to achieve a balanced condition. In an application of the present invention which utilizes a plurality of cups at the front and back axial ends of a rotatable drum and injects water into those cups to achieve the appropriate counterbalance action, test mass actions are first used to determine the sensory input variables for the matrices discussed in conjunction with equations 7 and 8 above.

In conjunction with the present invention an alternate one step test weight approach has been developed for a system as described in equations 9, 10, and 11, where the system has a rigid body that is rigidly attached to an immovable object. In an application of the present invention, this alternate method utilizes the measurements before and after injection into the plurality of cups discussed above, to determine error in both the measurement angle and the injection angle. The objective of this one step test weight approach is to determine errors while balancing and provide an automatic correction capability. In order to minimize machine vibration, the measured out-of-balance condition should have low force magnitudes. For the embodiment of FIG. 2, empirical tests have shown that force sensor levels of under two to three pounds force meet this requirement. At higher rotational speeds in which the out-of-balance is small and nearly meets this requirement, a single step injection into the front cups, intended as a test and counterbalance action, can balance the machine.

Alternately, a control strategy using a multi-step injection test weight approach (i.e., test and counterbalance action do not over lap) could initially increase the out-of-balance condition while using test actions to determine the out-of-balance location, and then attempt to balance the rotatable member with the next counterbalance injection only to be required to repeat the process because of the out-of-balance was moved considerably above the two to three pound force sensor requirements by the initial test action.

The motivation for the alternate one step test weight approach is to perform a single step, comprising injection of a predetermined water mass at one particular angler location on the rotatable member, which serves as a test and counterbalance action, using the test results to compensate for future injections while achieving a better balance condition. The one step test weight approach relies on certain assumptions. First, it is assumed that the force sensor magnitudes are accurate, thus the need to associate this technique with the rigid system described by equations 9, 10, and 11. Next it is assumed that measurement errors can exist in both the measurement angles and injection angles. In addition, it is assumed that the angular errors associated with the injectors placing water in a particular span of cups, are consistent. Although not all of these assumptions are accurate in all circumstances, the single step test weight approach is applied as an integral or cumulative process that will attempt to correct itself even if all of the assumptions are not exactly met.

Under the assumptions of rigidity stated above, a counterbalance action can be thought of as being placed 180 degrees opposite to the measured out-of-balance forces at the front and back planes of the rotational member, prior to the counterbalance action. If the measurement error in the angle is zero, the difference in the measured forces before and after the counterbalance injection should result in the magnitude being decreased and the angle before and after injection remaining the same, as shown in equations 29 and 30 where out-of-balance is abbreviated as OB.

$$F_{OBafter\ injection}@\theta_{OBbefore\ injection} = F_{OBbefore\ injection}@\theta_{OBbefore\ injection} + F_{counterbalance}@(\theta OBbefore\ injection+180\ degrees) \quad (29)$$

$$F_{OBafter\ injection}@\theta_{OBbefore\ injection} = (F_{OBbefore\ injection} - F_{counterbalance})@\theta_{OBbefore\ injection} \quad (30)$$

If the angular measurement error is zero, the angle of the out-of-balance force before and after injection will be the same. The test weight approach assumes a consistent error in the angle of measurement. The basic foundation for this test weight approach assumes that the difference in the measured forces before and after injection is equivalent to the actual forces before and after injection. This is shown in vector equations 31, 32 and 33. In other words, the consistent error in angular measurement drops out of the measured equation 33. The difference between the forces before and after injection is an indication of the actual counterbalance placement error. Therefore, the angular error between the desired counterbalance and the last counterbalance action is provided by the angle of the vector difference in equation 33.

$$\Delta F_{Ob\ actual} = \Delta F_{OB\ measured} \quad (31)$$

$$\Delta F_{OBactual} = F_{OBafterinjection\ actual} - F_{OBbeforeinjection\ actual} \quad (32)$$

$$\Delta F_{OBmeasured} = \Delta F_{OBafterinjection\ measured} - F_{OBbeforeinjection\ measured} \quad (33)$$

As previously described, the error is integral or cumulative. Therefore the most recently computed error is added to the existing error as shown in equation 34. The error for any particular injection will approach zero and the cumulative error angle will approach the consistent error value in the measured angle. The computed error in the angle can be used to inject in the appropriate location in order to achieve the desired result. The counterbalance is placed in a location such as the measured angle before and after injection remains the same and the magnitude of the out-of-balance decreases. This is shown in equation 35.

$$\theta_{error} = \theta_{error} + \theta_{error\ this\ injection} \quad (34)$$

$$\theta_{command\ injection\ angle} = \theta OBmeasured + 180\ degrees - \theta_{error} \quad (35)$$

The present invention has been described in specific detail in regard to the use of injected water into cups for the purpose of performing counterbalance operations. However, it should be understood that although prototype demonstrations and empirical tests have been performed to evaluate the present invention in conjunction with front and back cups, alternative counterbalance actuators can be used in conjunction with the present invention. FIGS. 11–14 compare two types of counterbalance mechanisms that can be used in conjunction with the present invention. FIG. 11 illustrates a rotatable member 54 such as a rotatable drum of a washing machine. At the axial ends of the rotatable member 54 are first and second pluralities of cups, 80 and 82. FIG. 12 illustrates the first plurality of cups that are disposed at an axial end of the rotatable member and rotate as indicated by the arrow. Each of the cups is configured to permit a predetermined mass of water to be injected into the cup and retain by the cup during rotation. For purpose of illustration, FIG. 13 shows two masses, 140 and 142, disposed in two cups. FIG. 12 illustrates the second plurality of cups with another mass 144 disposed in one of the cups. As described in greater detail above, the masses of water are typically injected into a span of cups under the control of a specially adapted program which times the rotation of the cups and injects water at the appropriate times so that the calculated counterbalance forces can be implemented.

Figure 14:
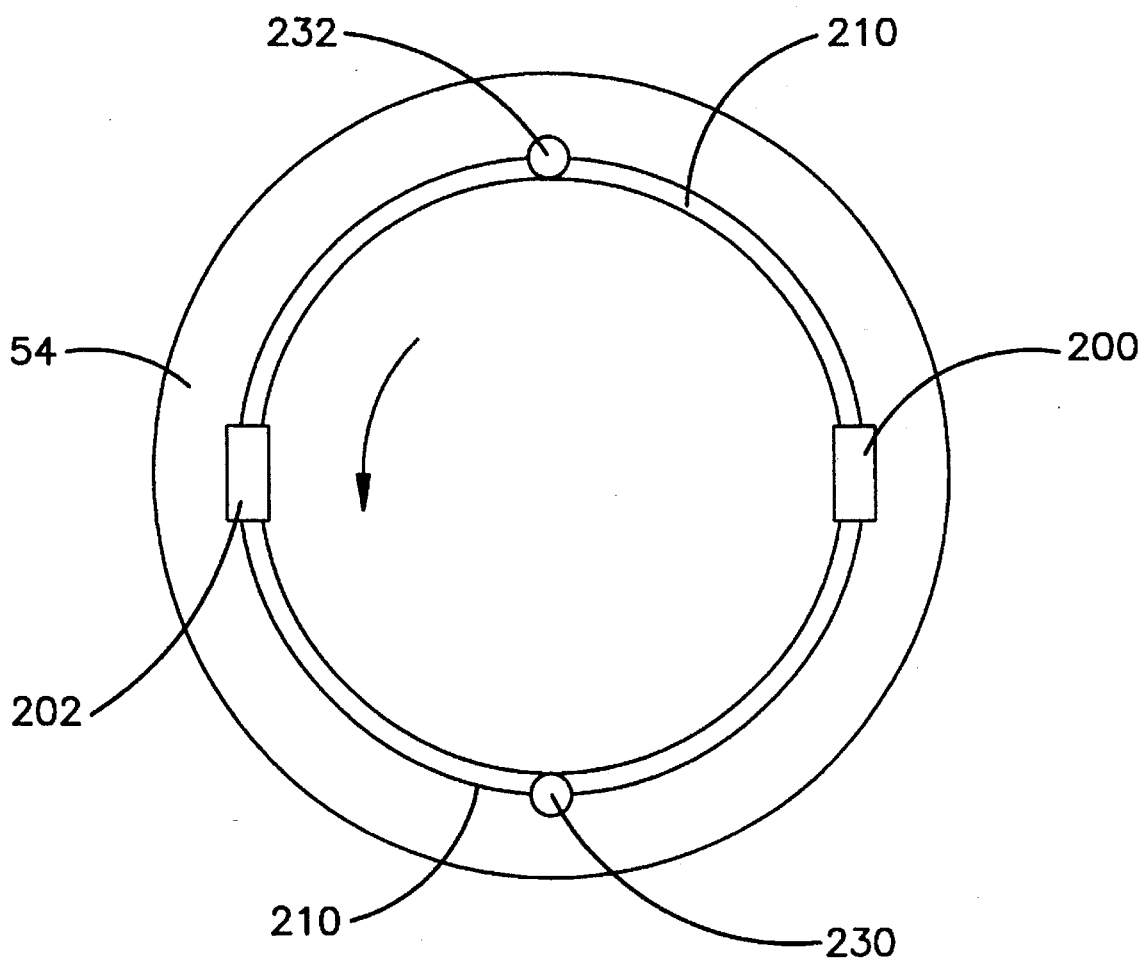
FIG. 14 is an alternative-method to cause masses to move along the periphery of a rotatable drum.

FIG. 14 illustrates an alternative method for moving masses relative to the rotatable member in order to achieve a calculated counterbalance force which is determined by the present invention. As an example, the rotatable member 54 can have two motors, 200 and 202, rigidly attached to the rotatable member. The motors can be provided with an appropriate linkage, such as those identified by reference numeral 210 and 212, which allow masses to be moved relative to the rotatable member 54. As shown in FIG. 14, these masses are identified by reference numerals 230 and 232. If used in conjunction with the present invention, the counterbalance calculations determined by the present invention would be past to a control algorithm that would operate motors 200 and 202 in such a way that the masses, 230 and 232, would move along the periphery in a coordinated manner so that a resultant counterbalance force is implemented. As described, techniques of the type shown in FIG. 14 are generally known to those skilled in the art.

Although the present invention has been described in significant detail and a particular embodiment is illustrated in the figures, is should be understood that alternative embodiments of the present invention are within its scope. For example, the use of water injectors or moveable masses driven by motors around the periphery of a rotatable member are possible means for actuating the counterbalance forces calculated by the present invention. However, these techniques are not limiting to the present invention and many other techniques are within its scope. In addition, several specific programs can be used in cooperation with the present invention to perform certain functions. The band pass filter is one example of these programs. In addition, the single valued decomposition algorithm is also one of these programs. However, it should be understood that the present invention does not depend on any particular subprogram to perform any particular function. Alternative means can be used to achieve the results of the present invention. In summary, the concept of the present invention is to measure both force and motion via acceleration and then use that information to calculate counterbalance forces at two axial positions of a rotatable member. Many different specific adaptations of this basic concept are within the scope of the present invention.

The embodiments of the invention in which an exclusive property or right is claimed are defined as follows:

1. A balancing system, comprising:

a rotatable member;

a shaft attached to said rotatable member;

first means for measuring a first force at a first location of said rotatable member;

second means for measuring a second force at a second location of said rotatable member;

third means for measuring a first acceleration at a third location of said rotatable member;

fourth means for measuring a second acceleration at a fourth location of said rotatable member;

first means for placing a first counterweight at a first preselected location of said rotatable member;

second means for placing a second counterweight at a second preselected location of said rotatable member; and means for determining said first and second preselected locations of said rotatable member as a function of said first and second forces and said first and second accelerations.

2. The system of claim 1, wherein:

said determining means comprises means for performing a single value decomposition calculation.

3. The system of claim 1, wherein:

said first and third locations of said rotatable member are coincident with each other; and said second and fourth locations of said rotatable member are coincident with each other.

4. The system of claim 1, wherein:

said first measuring means comprises a first plurality of force sensors.

5. The system of claim 1, wherein:

said second measuring means comprises a second plurality of force sensors.

6. The system of claim 1, wherein:

said third measuring means comprises a first accelerometer.

7. The system of claim 1, wherein:

said fourth measuring means comprises a second accelerometer.

8. The system of claim 1, wherein:

said rotatable member is a drum of a machine for washing articles.

9. The system of claim 1, wherein:

said first preselected location of said rotatable member is disposed at a first axial end of said rotatable member.

10. The system of claim 1, wherein:

said second preselected location of said rotatable member is disposed at a second axial end of said rotatable member.

11. The system of claim 1, wherein:

said first placing means comprises a first plurality of cups attached to said rotatable member and a first water injector attached to a stationary member for causing a preselected quantity of water to be injected into one or more of said first plurality of cups.

12. The system, of claim 1, wherein:

said second placing means comprises a second plurality of cups attached to said rotatable member and a second water ejector attached to said stationary member for causing a preselected quantity of water to be injected into one or more of said second plurality of cups.

13. A balancing system, comprising:

a rotatable member;

a shaft attached to said rotatable member;

first means for measuring a first force at a first location of said system;

second means for measuring a second force at a second location of said system;

third means for measuring a first acceleration at a third location of said system;

fourth means for measuring a second acceleration at a fourth location of said system;

first means for placing a first counterweight at a first preselected location of said rotatable member;

second means for placing a second counterweight at a second preselected location of said rotatable member; and means for determining said first and second preselected locations of said rotatable member as a function of said first and second forces and said first and second accelerations, said determining means comprising means for performing a single value decomposition calculation, said first measuring means comprising a first plurality of force sensors, said second measuring means comprising a second plurality of force sensors, said third measuring means comprising a first accelerometer, said fourth measuring means comprising a second accelerometer.

14. The system of claim 13, wherein:

said first and third locations of said system are coincident with each other; and said second and fourth locations of said system are coincident with each other.

15. The system of 13, wherein:

said rotatable member is a drum of a machine for washing articles.

16. The system of claim 13, wherein:

said first preselected location of said rotatable member is disposed at a first axial end of said rotatable member; and said second preselected location of said rotatable member is disposed at a second axial end of said rotatable member.

17. The system of claim 13, wherein:

said first placing means comprises a first plurality of cups attached to said rotatable member and a first water injector attached to a stationary member for causing a preselected quantity of water to be injected into one or more of said first plurality of cusp; and said second placing means comprises a second plurality of cups attached to said rotatable member and a second water ejector attached to said stationary member for causing a preselected quantity of water to be injected into one or more of said second plurality of cups.

18. A balancing system, comprising:

a rotatable member;

a shaft attached to said rotatable member;

first means for measuring a first force at a first location of said shaft;

second means for measuring a second force at a second location of said shaft;

third means for measuring a first acceleration at a third location of said shaft;

fourth means for measuring a second acceleration at a fourth location of said shaft;

first means for placing a first counterweight at a first preselected location of said rotatable member;

second means for placing a second counterweight at a second preselected location of said rotatable member; and means for determining said first and second preselected locations of said rotatable member as a function of said first and second forces and said first and second accelerations, said determining means comprising means for performing a signal value decomposition calculation, said first measuring means comprising a first plurality of force sensors, said second measuring means comprising a second plurality of force sensors, said third measuring means comprising a first accelerometer, said fourth measuring means comprising a second accelerometer, said first and third locations of said shaft being coincident with each other, said second and fourth locations of said shaft being coincident with each other.

19. The system of claim 18, wherein:

said rotatable member is a drum of a machine for washing articles.

20. The system of claim 18, wherein:

said first preselected location of said rotatable member is disposed at a first axial end of said rotatable member;

said second preselected location of said rotatable member is disposed at a second axial end of said rotatable member;

said first placing means comprises a first plurality of cups attached to said rotatable member and a first water injector attached to a stationary member for causing a preselected quantity of water to be injected into one or more of said first plurality of cups; and said second placing means comprises a second plurality of cups attached to said rotatable member and a second water ejector attached to said stationary member for causing a preselected quantity of water to be injected into one or more of said second plurality of cups.

* * * * *